(12) United States Patent
Zumsteg

(10) Patent No.: US 9,292,719 B2
(45) Date of Patent: Mar. 22, 2016

(54) RFID APPARATUS CALIBRATION

(71) Applicant: HAND HELD PRODUCTS, INC., Fort Mill, SC (US)

(72) Inventor: Philip Zumsteg, Shorewood, MN (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 14/448,324

(22) Filed: Jul. 31, 2014

(65) Prior Publication Data

US 2016/0034724 A1 Feb. 4, 2016

(51) Int. Cl.
| | |
|---|---|
| *G06K 7/00* | (2006.01) |
| *G06K 7/015* | (2006.01) |
| *G06K 7/10* | (2006.01) |
| *G06K 19/07* | (2006.01) |
| *G06K 19/077* | (2006.01) |

(52) U.S. Cl.
CPC ............ *G06K 7/015* (2013.01); *G06K 7/10316* (2013.01); *G06K 7/10386* (2013.01); *G06K 19/072* (2013.01); *G06K 19/0723* (2013.01); *G06K 19/07749* (2013.01)

(58) Field of Classification Search
CPC ...... G06K 7/084; G06K 7/0095; G06K 7/015
USPC .................. 235/436, 437, 439, 440
See application file for complete search history.

(56) References Cited

U.S. PATENT DOCUMENTS

| | | | |
|---|---|---|---|
| 2010/0109903 A1* | 5/2010 | Carrick ................... | 340/825.49 |
| 2011/0080267 A1* | 4/2011 | Clare et al. .................. | 340/10.4 |
| 2011/0187600 A1* | 8/2011 | Landt ........................... | 342/458 |
| 2011/0234398 A1* | 9/2011 | Romaine et al. ......... | 340/539.13 |

* cited by examiner

*Primary Examiner* — Daniel St Cyr
(74) *Attorney, Agent, or Firm* — Oliff PLC; R. Brian Drozd

(57) ABSTRACT

Calibrating an RFID apparatus includes: positioning the RFID apparatus within a distance of an RFID tag array, the RFID apparatus having an RFID antenna to detect RFID tags and at least one motion sensing device; aligning the RFID apparatus with the RFID tag array using the motion sensing device; acquiring (i) RFID tag information including signal strength using the RFID antenna to generate an RFID antenna radiation pattern that includes a region of at least one RFID tag exceeding a signal strength, and (ii) position information of the RFID tag in the RFID tag array; and determining calibration values of the RFID apparatus based on a one or more alignment differences between the acquired region of the RFID tag information and the position information of the motion sensing device; adjusting the RFID apparatus scan path data acquired from the at least one motion sensing device using the determined calibration values.

20 Claims, 17 Drawing Sheets

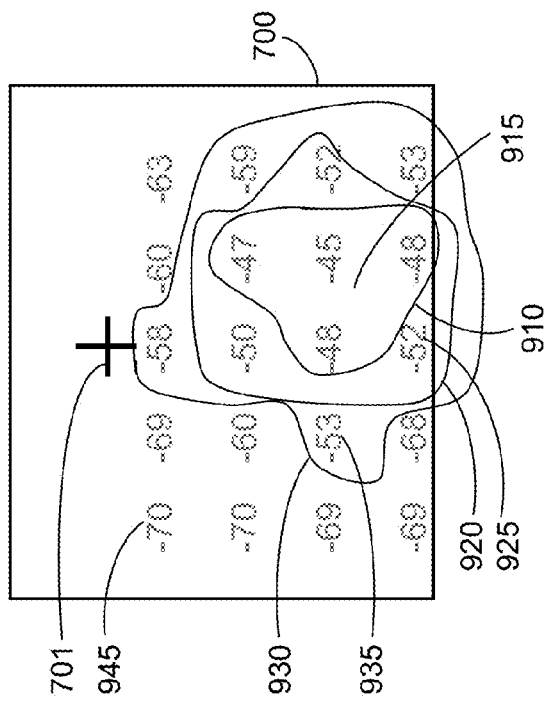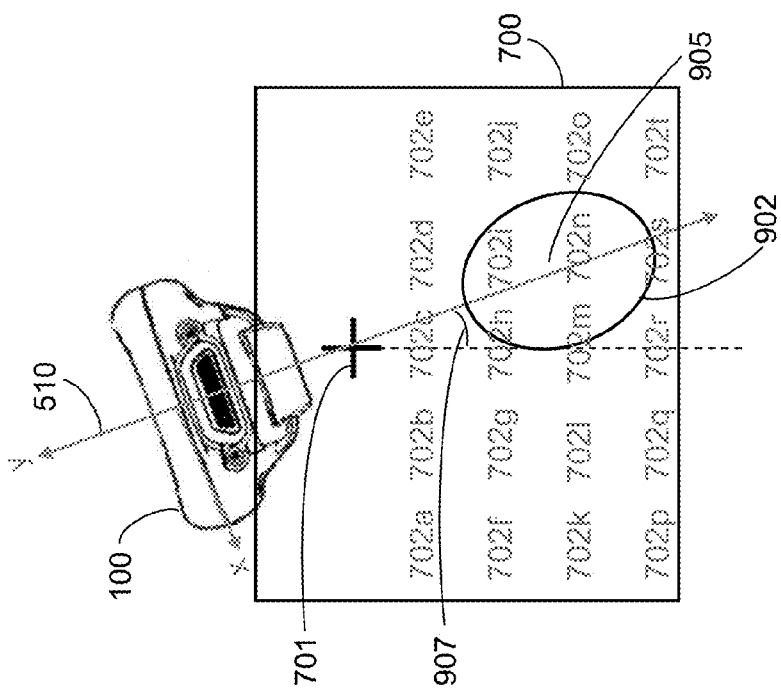

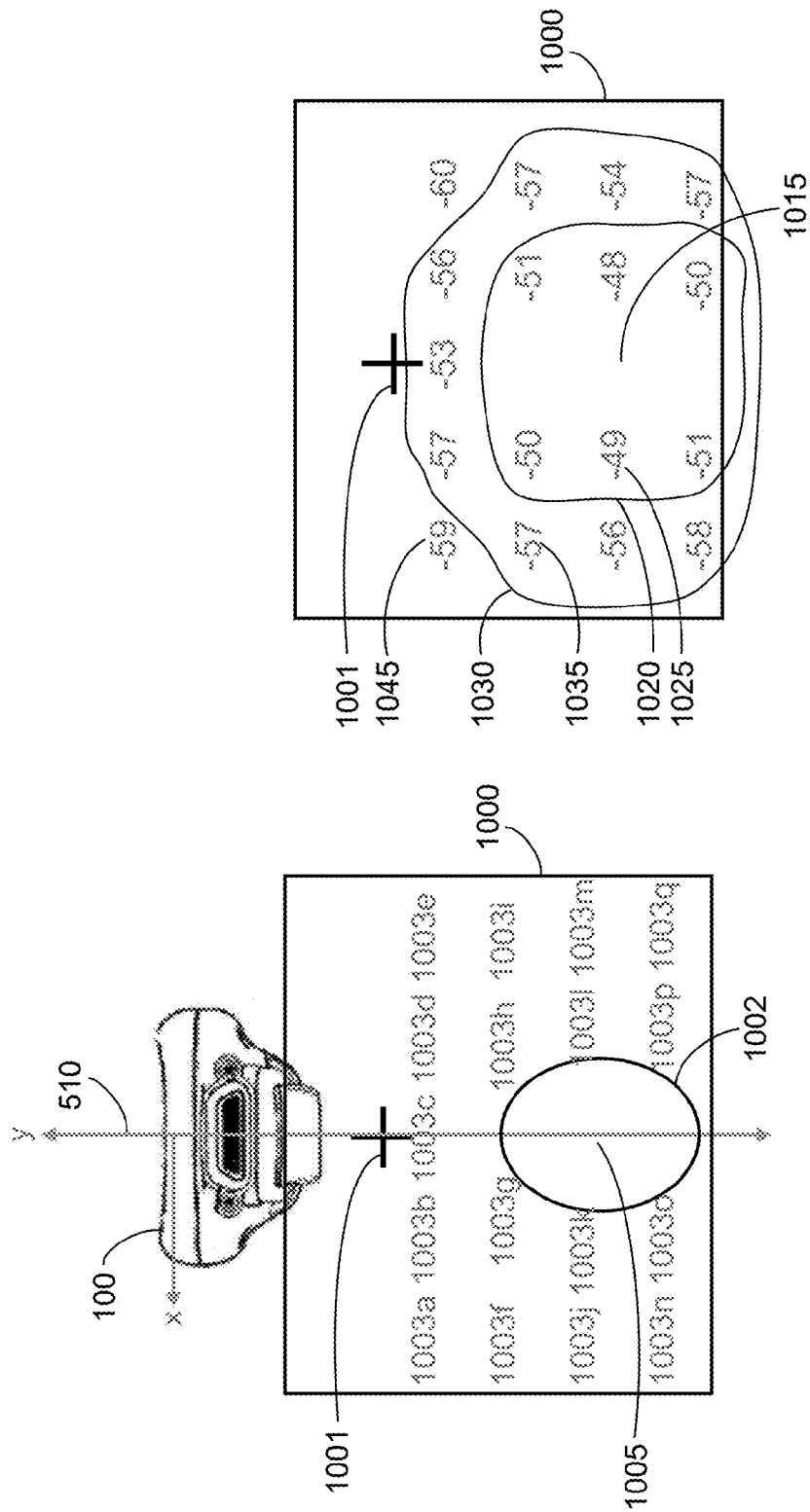

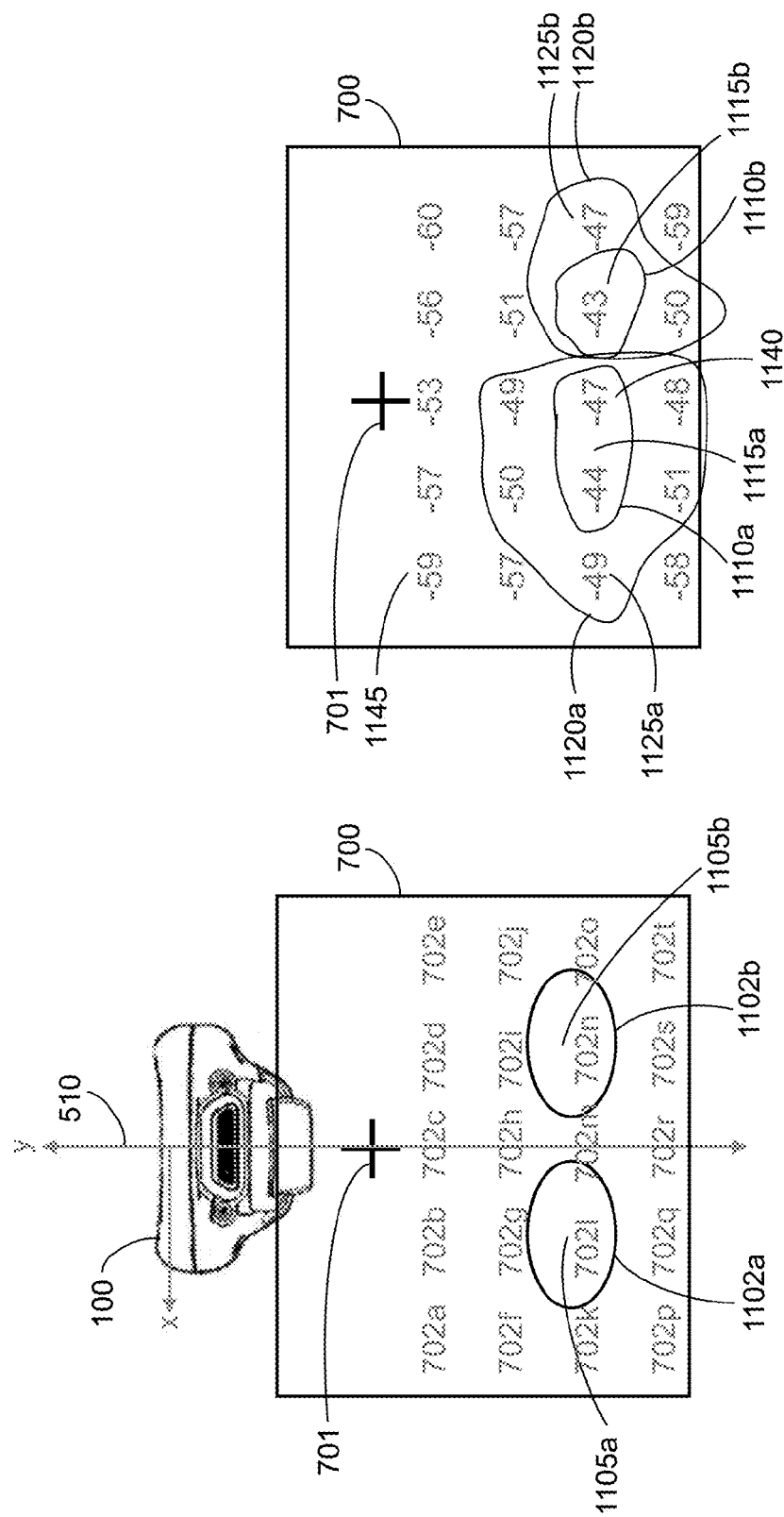

RFID APPARATUS CALIBRATION

BACKGROUND

Radio-frequency identifier (RFID) methods are widely used for a number of tasks, including smart cards, supporting maintenance tasks, identification badges, tracking objects in manufacturing, retail inventory management, etc. An RFID tag can be attached, e.g., to an inventory object. An RFID apparatus can be configured with an RFID reading device including one or more antennas to read the memory of an RFID tag attached to an inventory object.

The RFID apparatus may be a hand-held device with integrated RFID reading capabilities, can read RFID tags from a range of distances, such as during a retail floor inventory operation. However, one may not know whether all physical structures such as retail floor fixtures (and by extension, all items with attached RFID tags) in a given department have been inventoried. Additionally, it is quite time consuming for the user of an RFID apparatus to perform retail floor inventory multiple times to increase the total number of items included in the inventory.

Further, users typically have no skills for determining an axis of maximum gain, or boresight, for the RFID reading device antenna radiation pattern, which may be affected by the polarization of the one or more antennas in use, and the manner in which the user holds the RFID apparatus. For instance, left-handed use may provide different results than right-handed use, and a one-handed grip may provide different results than a two-handed grip.

Since the RFID reading device antenna radiation pattern is invisible, the user is unable to correlate the motion of the RFID apparatus with the path of the RFID antenna boresight over which RFID tags on the fixtures are read. Further, the motion sensing device frame of reference may not be aligned with the boresight of the RFID reader antenna radiation pattern when the IMU or imaging system has a different boresight than the RFID reader antenna radiation pattern. Thus, the motion path depicted from a sequence of motion sensing device data may not always properly indicate the RFID tag read path of the RFID antenna pattern. The depicted motion path thus may be incorrect and even mislead the user.

Thus, there is needed a way to efficiently and accurately determine the differences in alignment between the motion sensing device frame of reference and the RFID reading device antenna pattern boresight. There is also needed a way to automatically correct time-varying data from a motion sensing device to more accurately depict the path over which RFID tags are read by the RFID apparatus.

SUMMARY

To overcome these and other challenges, aspects of broad inventive principles are disclosed herein. In one aspect, a method is provided of calibrating an RFID apparatus, the method comprising: positioning the RFID apparatus in a calibration location within a predetermined distance of an RFID tag array having a visible reference mark, the RFID apparatus having at least one RFID reader device including an RFID antenna to detect RFID tags and at least one motion sensing device; aligning the RFID apparatus with the RFID tag array using the motion sensing device; acquiring (i) RFID tag information including signal strength, using the at least one RFID antenna to generate an RFID reader antenna pattern that includes a heat map, the heat map including a region of at least one RFID tag exceeding a predetermined signal strength, and (ii) position information and unique identification information stored in the at least one RFID tag; and determining calibration values for the RFID apparatus based on alignment differences between the acquired region of the RFID tag information and at least one sensing axis of the motion sensing device.

The method may also include computing an approximate axis of maximum gain of the RFID reader device antenna radiation pattern that represents an RFID boresight and computing one or more offsets of the approximate center of the heat map relative to a visual reference mark on the RFID tag array to determine one or more alignment differences between the visual reference mark on the RFID tag array and the boresight of the RFID reading device antenna pattern; and computing one or more alignment differences between the at least one sensing axis of the motion sensing device and the RFID tag array relative to a visible reference mark on the RFID tag array.

In another aspect, a computer readable medium is provided including at least one processor and a memory storing instructions that, when executed, cause a computer to execute steps comprising: determining when the RFID apparatus is within a predetermined distance of an RFID tag array having a visual reference mark, the RFID apparatus having at least one RFID reading device including an RFID antenna to detect RFID tags and at least one motion sensing device and at least one visual illumination device, using the at least one visual illumination device to generate visual data for aligning the RFID apparatus with the RFID tag array; acquiring (i) RFID tag information including data and signal strength, using the at least one RFID antenna to generate an RFID reader antenna radiation pattern that includes a heat map, the heat map including a region of at least one RFID tag exceeding a predetermined signal strength, and (ii) position and orientation information of the RFID apparatus relative to the RFID tag array using visual data of the illumination device; computing an approximate center of the RFID reading device antenna pattern that represents an RFID reader antenna boresight; computing one or more offsets of the approximate center of the heat map from the visual data on the RFID tag array to determine alignment differences between the motion sensing device frame of reference and RFID reader antenna boresight; and adjusting the RFID apparatus motion path data based on the determined alignment differences.

In another aspect, a system is provided for calibrating a scan path, comprising: a RFID apparatus that is configured to calibrate when within a predetermined distance of an RFID tag array; at least one motion sensing device configured to align the RFID apparatus to a visible reference mark on the RFID tag array using visual data, the at least one motion sensing device configured to acquire position and orientation information of the RFID apparatus relative to the RFID tag array using the visual data of the motion sensing device; at least one RFID reader device including an antenna configured to acquire RFID tag information including data and signal strength using the at least one RFID reader device antenna to generate an RFID antenna radiation pattern that includes a heat map, the heat map including a region of at least one RFID tag exceeding a predetermined signal strength; at least one processor; and a memory storing instructions that, when executed, cause the processor to perform steps: computing an approximate center of the RFID antenna radiation pattern that represents an RFID boresight and computing one or more offsets of the approximate center of the heat map from the visible reference mark of the RFID tag array to determine one or more alignment differences between the visible reference mark of the RFID tag array and the approximate center of the RFID antenna radiation pattern; and adjusting the RFID apparatus scan path data obtained from the at least one motion sensing device based on the determined differences.

BRIEF DESCRIPTION OF THE DRAWINGS

FIGS. 9A and 9B illustrate RFID tag signal strength values and heat map for a selected set of angles, including at least a rotation angle, of the motion sensing device frame of reference relative to an RFID tag array for an inclusion calibration mode according to one embodiment.

FIGS. 10A and 10B illustrate RFID tag signal strength values and heat map for a selected set of angles, including at least a vertical angle, of the motion sensing device frame of reference relative to an RFID tag array for an exclusion calibration mode according to one embodiment.

FIGS. 11A and 11B illustrate RFID tag signal strength values and heat map for a selected set of angles, including at least a vertical angle, of the motion sensing device frame of reference relative to an RFID tag array for an inclusion calibration mode with more than one region of the heat map having an RFID tag signal strength exceeding a predetermined signal strength according to one embodiment.

DETAILED DESCRIPTION OF THE EMBODIMENTS

Figure 1:
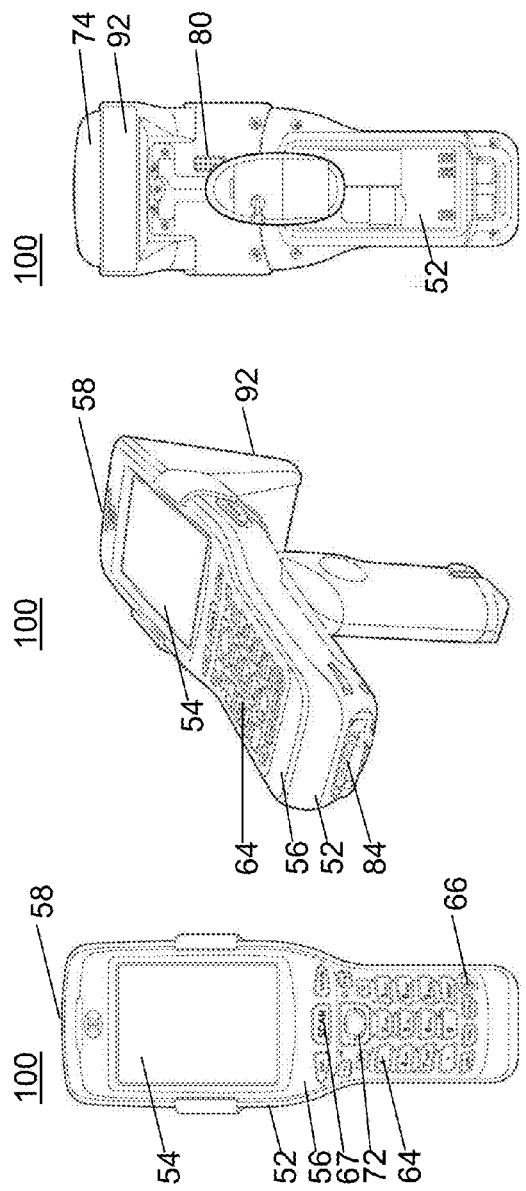
FIGS. 1A, 1B, 1C and 1D schematically illustrate an RFID apparatus according to one embodiment.

The exemplary embodiments described herein provide detail for illustrative purposes and are subject to many variations in structure and design. It should be emphasized, however, that the present invention is not limited to a particularly disclosed embodiment shown or described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The terms "a," "an," and "the" herein do not denote a limitation of quantity, but rather denote the presence of at least one of the referenced object. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, as will be appreciated by one skilled in the art, aspects of the present disclosure may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." In addition, aspects of the present disclosure may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM) or similar DVD-ROM and BD-ROM, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

At least some of the present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In retail facilities, objects may be placed on a plurality of different fixtures. The fixtures can be, for example, shelving units, linear clothing racks, non-linear clothing racks, tables with one or more surfaces, or any combination thereof. Employees are often tasked to periodically determine the current status of inventory within the facility. One option for determining inventory status is to tag each object with an RFID tag and for an employee to approach a fixture with a RFID apparatus that includes a processor, a memory, an RFID tag reading device, a motion sensing device such as an Inertial Measurement Unit (IMU), a communication interface, and a camera system. The employee moves the RFID apparatus along a scan path determined by a series of periodically acquired data sets from the motion sensing device, while performing the inventory status process. The path over which RFID tags are read by the RFID reader device antenna radiation pattern may be different than scan path determined from the motion sensing device data samples. Thus, one should know a more accurate path over which RFID tags are read by determining the alignment differences between the frames of reference of the motion sensing device and the RFID reader antenna radiation pattern and correcting the scan path data from the motion sensing device using these determined alignment differences, to display a more accurate RFID tag reading path on the RFID apparatus.

Some embodiments of the present application describe methods to depict a path resulting from the time-varying position and orientation, or motion, of an RFID apparatus during the inventory operation. These methods include a motion sensing device, including one or more of an inertial measurement unit (IMU), camera, or other device to obtain time-varying data describing the motion of the RFID apparatus, relative to a frame of reference of the motion sensing device. Thus, the user may be able to see a depiction of the motion path of the RFID apparatus overlaid on an image in relation to an initial scan point. U.S. patent application Ser. No. 13/744,447, entitled "Portable RFID Reading Terminal with Visual Indication of Scan Trace", which discloses methods for tracking motion of an RFID apparatus using a sequence of images obtained from an RFID apparatus including a camera, and U.S. patent application Ser. No. 13/359,005, entitled "Portable RFID Reading Terminal with Visual Indication of Scan Trace" and U.S. patent application Ser. No. 13/452,133 "System and Method for Calibration and Mapping of Real Time Location Data", which disclose methods for determining the time-varying position and orientation of an RFID apparatus based on an initial point establishment, and U.S. patent application Ser. No. 13/451,959 "Portable Encoded Information Reading Terminal Configured To Adjust Transmit Power Level" which discloses methods for adjusting the size of an area in which RFID tags may be read using an RFID reader device and RFID antenna at a determined distance.

In one embodiment, there is provided an RFID apparatus comprising a radio frequency identifier (RFID) reading device including at least one RFID antenna and at least one transmit power level control. The RFID apparatus can be configured to read decodable indicia such as RFID tags containing encoded messages. In one embodiment, the RFID apparatus can be configured to read an RFID tag containing an encoded message and output raw message data containing the encoded message. In another embodiment, the RFID apparatus is configured to read an RFID tag containing an encoded message and output decoded message data corresponding to the encoded message. In another embodiment, the RFID apparatus is configured to measure the signal strength of an RFID tag currently being read by the RFID apparatus.

It should be noted that the RFID apparatus is referred to herein for ease of illustration. However, it should be understood that the RFID apparatus may be any reader (such as an RFID apparatus with a camera or with an IMU) and should not be limited.

Various embodiments of the RFID apparatus can be used in numerous applications, including, but not limited to, authentication and access control systems (for example, using smart cards), object tracking in manufacturing and retail, etc. A smart card is an identification card (e.g., a credit card, a pass card) which does not need to be swiped or otherwise physically contacted by a card reader. This capability can be implemented by placing an RFID tag in the card. Object tracking can be implemented by placing an RFID tag on each individual object. In retail, object tracking with RFID tags can be used in conjunction with other technologies such as bar code scanning and payment terminals. Object tracking with RFID tags can be used in loss prevention systems by placing an RFID tag into merchandise objects and placing sensors at exit points. If an exit sensor detects a tagged object with a tag, which was not deactivated at the checkout, an alarm can go off.

One embodiment of RFID apparatus 100 is shown in FIGS. 1A (front panel view), 1B (oblique panel view), 1C (bottom panel view), and 1D (side panel view). RFID apparatus 100 can comprise housing 52 within which other components of RFID apparatus 100 can be disposed. Power key 66 and LCD screen display with touch screen sensor 54 can be disposed on the front panel 56. Also disposed on front panel 56 can be scan or decode LED 58, and keyboard 64 including front panel scan key 67 and navigation keys 72. Disposed on the side panel (best viewed in FIG. 1B) can be multi-pin mechanical connector. Disposed on the bottom panel (best viewed in FIG. 1C) can be window 74 and camera system 353 can be disposed within housing 52 behind imaging window 74 for protection. Illuminator 330 may also be disposed within housing 52 behind protective imaging window 74 in a cooperative manner with camera system 353. In one embodiment, imaging window 74 may include a fisheye lens or other lens intended to provide a panoramic view to ensure that a camera can capture sufficiently large images of fixtures arranged close to one another (e.g., in an aisle between fixtures). Also disposed on the bottom panel can be RFID antenna housing 92 and RFID read device 333 can be disposed within housing 52. Also disposed on the bottom panel is audio speaker 80. Disposed on the lower side panel (best viewed in FIG. 1D) can be access door to a secure digital (SD) memory interface 78, and grip scan key 68

While FIGS. 1A-1D illustrate one embodiment of a hand held housing, a skilled artisan would appreciate the fact that other types and form factors of terminal housings are within the scope of this disclosure.

Figure 2:
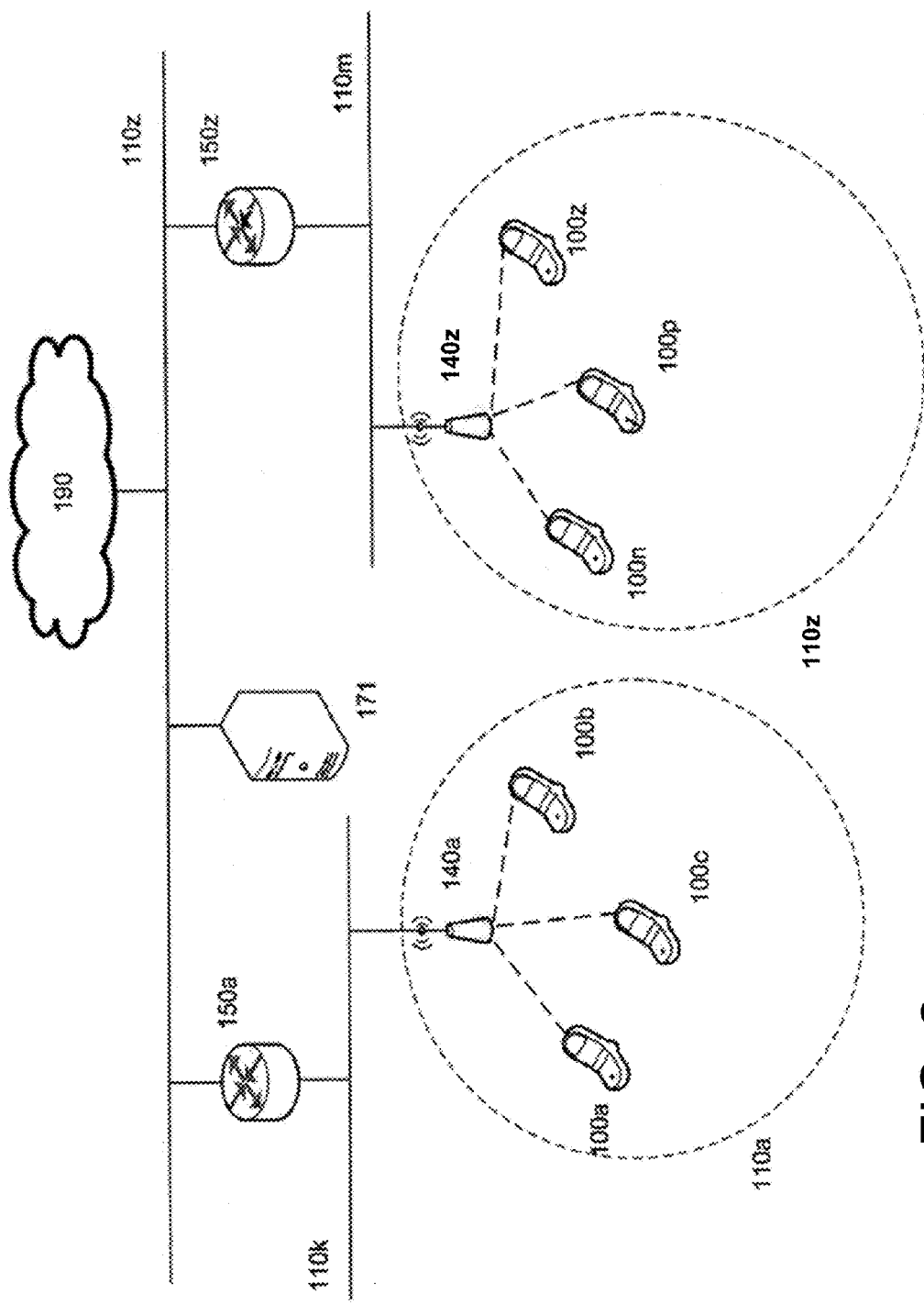
FIG. 2 depicts a network-level layout of a data collection system utilizing one or more RFID apparatus according to one embodiment.

In a further aspect, the RFID apparatus can be incorporated in a data collection system. The data collection system, schematically shown in FIG. 2, can include a plurality of routers 150a-150z, a plurality of access points 140a-140z, and a plurality of RFID apparatus 100a-100z in communication with a plurality of interconnected networks 110a-110z. In one aspect, the plurality of networks 110a-110z can include at least one wireless communication network. In a further aspect, an RFID apparatus can comprise a communication interface which can be used by the RFID apparatus to connect to one or more networks 110a-110z. In one embodiment, the communication interface can be provided by a wireless communication interface.

The RFID apparatus 100c can establish a communication session with the host computer 171. In one embodiment, network frames can be exchanged by the RFID apparatus 100c and the host computer 171 via one or more routers 150, base stations, and other infrastructure elements. In another embodiment, the host computer 171 can be reachable by the RFID apparatus 100c via a network 110k, such as a local area network (LAN). In yet another embodiment, the host computer 171 can be reachable by the RFID apparatus 100c via a network 110k, such as a wide area network (WAN). A skilled artisan would appreciate the fact that other methods of providing interconnectivity between the RFID apparatus 100c and the host computer 171 relying upon LANs, WANs, virtual private networks (VPNs), and/or other types of network are within the scope of this disclosure.

In one embodiment, the communications between the RFID apparatus 100c and the host computer 171 can comprise a series of HTTP requests and responses transmitted over one or more TCP connections. In one embodiment, the communications between the RFID apparatus 100c and the host computer 171 can comprise VoIP traffic transmitted over one or more TCP and/or UDP ports. A skilled artisan would appreciate the fact that using other transport and application level protocols is within the scope and the spirit of the invention.

In one aspect, at least one of the messages transmitted by the RFID apparatus can include decoded message data obtained from decodable indicia (e.g., a bar code label or an RFID label) attached to a product such as 405 or to a shipment object or to a fixture such as 423. For example, a RFID apparatus can transmit a request to the host computer to retrieve product information corresponding to a product identifier encoded by a bar code label attached to the product, or to transmit a product tracking record for a product identified by a bar code label attached to the product. In another example, a RFID apparatus can transmit a request to the host computer to retrieve information about the fixture.

Figure 3:
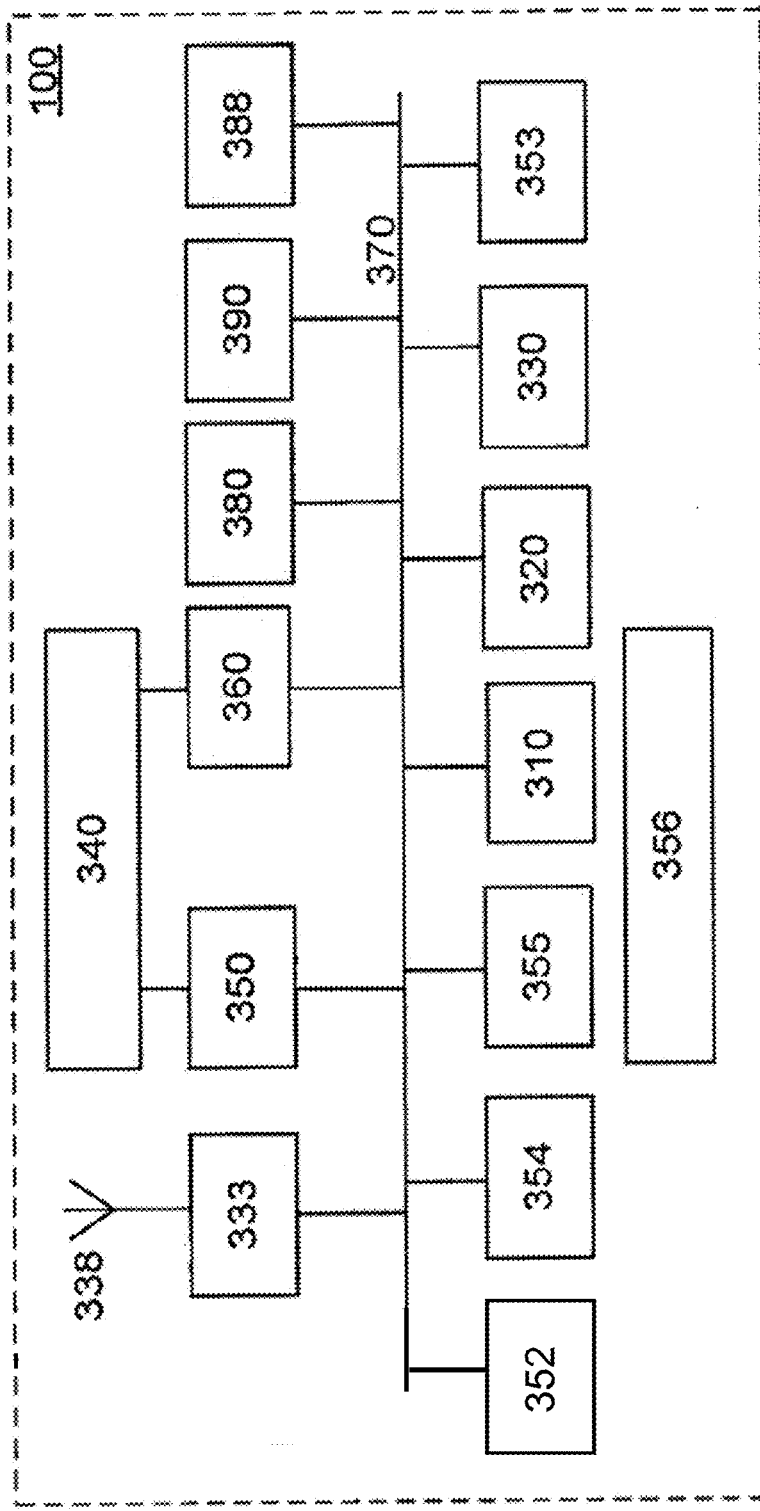
FIG. 3 depicts component-level layout of an RFID apparatus according to one embodiment.

Component-level diagram of one embodiment of an RFID apparatus is now being described with references to FIG. 3. RFID apparatus 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, RFID apparatus 100 can comprise a single microprocessor which can be referred to as a central processing unit (CPU). In another embodiment, RFID apparatus 100 can comprise two or more microprocessors, for example, a CPU providing some or most of the RFID apparatus functionality and a specialized microprocessor performing some specific functionality. A skilled artisan would appreciate the fact that other schemes of processing tasks distribution among two or more microprocessors are within the scope of this disclosure. The memory 320 can comprise one or more types of memory. including but not limited to: random-access-memory (RAM), non-volatile RAM (NVRAM), etc.

RFID apparatus 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family. Module 360 is an additional modular component that can be replaced with upgraded or expanded modules and is disposed between the system bus 370 and communication interface 340. This module 360 is compatible with, for example, auxiliary hard drives (including flash memory), RAM, communication interfaces, etc.

RFID apparatus 100 can further comprise a camera system 353 and an image interpretation and processing module 388. In one embodiment, the image interpretation and processing module 388 receives image data from camera system 353. In another embodiment, the processing module 388 coupled to the system bus 370 exchanges data and control information with the microprocessor 310 or memory 320.

RFID apparatus 100 can further comprise a keyboard interface 354 and a display adapter 355, both also coupled to the system bus 370. RFID apparatus 100 can further comprise a battery 356. In one embodiment, the battery 356 can be provided by a replaceable, rechargeable battery pack.

RFID apparatus 100 can further comprise a GPS receiver 380. RFID apparatus 100 can further comprise at least one connector 390 configured to receive a subscriber identity module (SIM) card.

RFID apparatus 100 can further comprise one or more illuminating devices 330, provided by, for example, but not limited to, a laser or light emitting diode (LED).

RFID apparatus 100 can further comprise one or more encoded indicia reading (EIR) devices 333 provided by, for example, but not limited to, an RFID reading device, a bar code reading device, or a card reading device. In one embodiment, the RFID apparatus can be configured to read an encoded message from a decodable indicia 406 using EIR device 330, and to output raw message data containing the encoded message. In another embodiment, the RFID terminal can be configured to read an encoded message from a decodable indicia 406 using EIR device 330, and to output decoded message data corresponding to the encoded message. As used herein, "message" is intended to denote a character string comprising alphanumeric and/or non-alphanumeric characters. An encoded message can be used to convey information, such as identification of the source and the model of a product, for example, in a UPC code. An encoded message can also be used to convey information about a fixture, such as the fixture dimensions and configuration of storage available for products.

Of course, devices that read bar codes, read RFID tags, or read cards bearing encoded information may read more than one of these categories while remaining within the scope of this disclosure. For example, a device that reads bar codes may include a card reader, and/or RFID reader; a device that reads RFID tags may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is a device that reads bar codes for purposes of this disclosure.

As noted herein supra, in one embodiment, RFID apparatus 100 can further comprise an RFID reading device 333. RFID apparatus 100 can be configured to read RFID tags containing decoded messages. In one embodiment, the RFID terminal can be configured to read, using RFID reading device 333, an RFID tag containing an encoded message, and to output raw message data containing the encoded message. In another embodiment, the RFID terminal can be configured to read, using RFID reading device 333, an RFID tag containing an encoded message, and to output decoded message data corresponding to the encoded message. In another embodiment, the RFID reading device 333 can be configured to measure the signal strength of the RFIG tag being read and communicate such measurements to the microprocessor 310 or memory 320. In another embodiment, the RFID reading device 333 can be configured to adjust the RFID transmit power level.

In a further aspect, the RFID reading device can comprise at least one antenna 338.

In another embodiment of the present invention, the RFID apparatus 100 includes an inertial measurement unit (IMU) 350 (containing at least 3-axis accelerometer, 3-axis magnetometer and 3-axis gyroscope sensors which may provide orientation) utilized to record both the position of the RFID apparatus 100 in three dimensional space and record the initial point coordinates (IPC). The IMU 350 also assists the RFID apparatus 100 in determining the orientation of the RFID apparatus 100, both during the process of establishing the IPC and as the RFID apparatus moves through space. The orientation of the RFID apparatus 100 describes the position of the RFID apparatus 100 itself relative to physical structure 401. An RFID apparatus 100 can be at a given position, for example ($x_1$, $y_1$, $z_1$) but the orientation of the RFID apparatus at this position may vary. The RFID apparatus may be held perfectly upright at this position to define one orientation, but the RFID apparatus may also be moved to an angle relative to any direction in three dimensional space (while the position of the RFID apparatus is unchanged). This movement represents a change in orientation. In one embodiment, during the process of establishing the IPC and when the RFID apparatus 100 is moved relative to the initial point, both the position and the orientation of the RFID apparatus 100 are calculated by the camera system 353 and/or the IMU 350 and the resultant data is stored in a resource, including, but not limited to, an internal resource in the RFID apparatus 100 and/or an external memory resource accessible to the RFID apparatus 100 via a communications connection.

In one embodiment, the RFID apparatus 100 may also include an encoded indicia reader (EIR) 330, such as a laser scanner for scanning a barcode.

As mentioned above, some embodiments of the present application incorporated herein above relate to the creation of a scan path using the RFID apparatus, including; establishment of the initial point coordinates (IPC), and the periodic acquisition of data sets from a motion sensing device such as an IMU 350 or camera 353; with the RFID apparatus configured to read RFID tags using the RFID reader 333 and RFID antenna 338. In one embodiment, the RFID apparatus is configured to read RFID tags when the user presses the front panel scan key 67 or grip scan key 68. In another embodiment the RFID apparatus is configured to read RFID tags by the user interacting with the LCD display and touch screen 54. The created scan path indicates the path of at least one sensing axis of the motion sensing device, such as an IMU 350 or camera 353. It should be noted that the scan path may be continuous or non-continuous.

Figure 4:
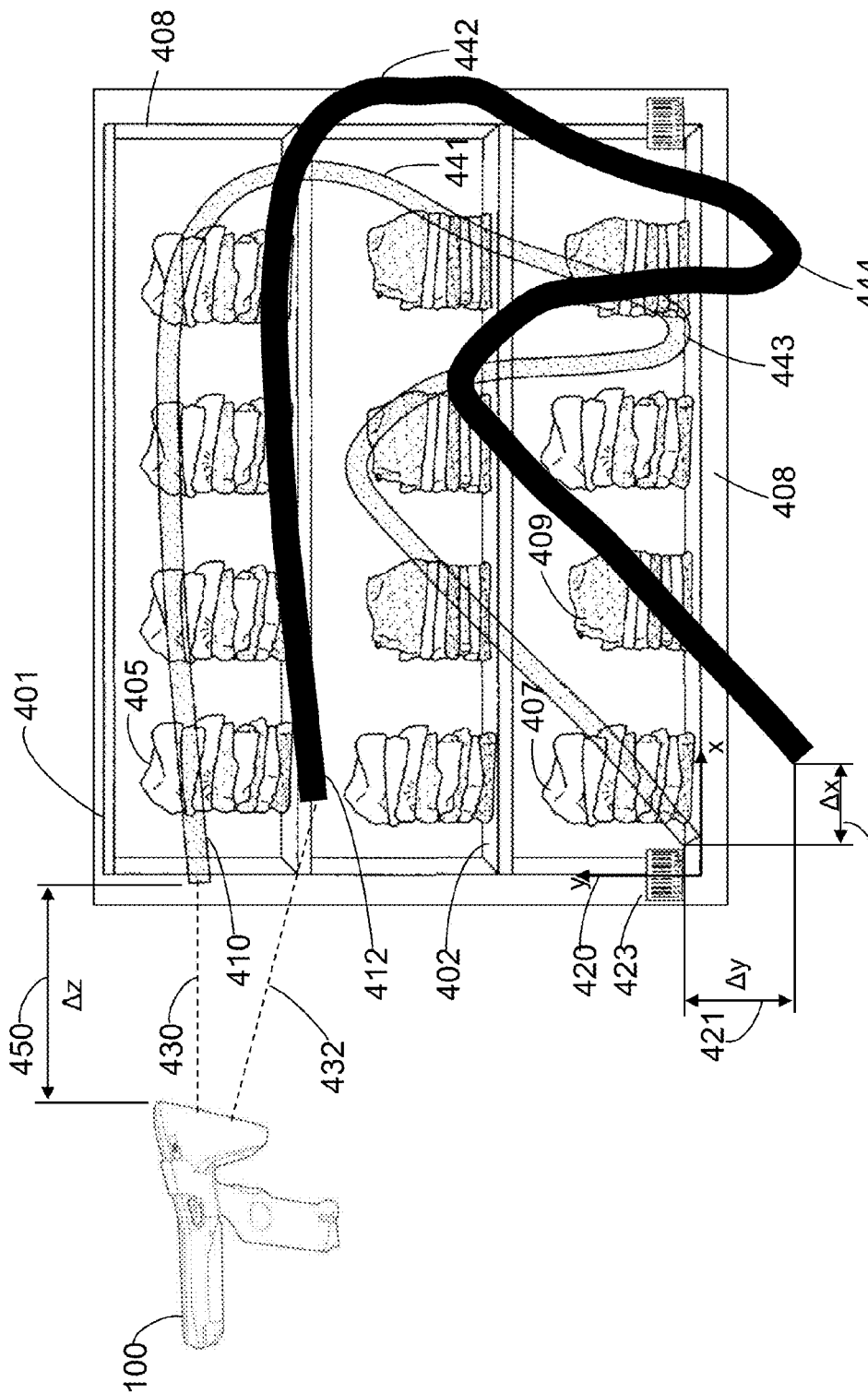
FIG. 4 schematically illustrates an RFID apparatus scan path of a physical structure such as a retail display fixture according to one embodiment.

FIG. 4 schematically illustrates an example of a scan path 410 of a fixture 401 as described by the prior art. As shown in FIG. 4, one embodiment of a scan path 410 that can represent the tracked motion of the RFID apparatus 100 is shown graphically superimposed on an image of a fixture 401. Such superimposition is graphically displayed on the RFID apparatus 100, for example, by using the LCD display 54 to depict a virtual representation of the scan path 410 relative to a predetermined image of a fixture. This allows the user to ascertain where the RFID apparatus 100 has scanned relative to the fixture. The scan path 410 is created from data sets periodically acquired from the motion sensing device, such as an IMU 350 or camera 353. The depiction of scan path 410 on the LCD display 54 indicates the path of a least one sensing axis of the motion sensing device, such as an IMU 350 or camera 353, and not the path 412 over which RFID tags are read by the RFID reader device 333 and RFID antenna 338. The depiction of scan path 410 to the user of the RFID apparatus incorrectly indicates regions of the fixture 401 were RFID tags were acquired by the RFID apparatus. Scan path 410 crosses region 405 where RFID tags may be located, though the RFID boresight path 412 may not have successfully read RFID tags in region 405. For region 407, the scan path 410 crosses the region where RFID tags may be located, while the RFID boresight path 412 does not cross region 407 and no RFID tags were read in region 407. The scan path 410 does not cross region 409 indicating to the user that no RFID tags were read in region 409, while RFID boresight path 412 does corss region 409 and RFID tags may have been read.

Preferentially, the scan path can be a path of the RF antenna pattern using at least one RFID antenna from the RFID apparatus where it intersects the front plane of a physical structure (i.e., a retail store display fixture). The diameter of the scan path point is a function of the RFID antenna pattern, RF transmit power level, separation distance 450 and orientation between the RFID apparatus and the front plane of the physical structure. Scan path 412 can indicate a path of the RFID reader antenna radiation pattern based on a boresight 432 of the RFID antenna radiation pattern. As explained in more detail with regard to FIG. 5, scan path 412 is determined based on alignment differences between the motion sensing device frame of reference and the RFID reader antenna radiation pattern boresight. As seen from FIG. 4, scan path 410 and scan path 412 can be offset because the frame of reference of the motion sensing device (e.g., camera 353 or IMU 350) can be different than the boresight of the RFID reader antenna radiation pattern for a selected transmit power level. The offset distance between scan path 410 and RFID boresight path 412 can differ due to the alignment differences, having one or both of a vertical offset 421 and a horizontal offset 422 relative to a frame of reference 420 of the fixture 401. Further, the offset distance between scan path 410 and scan path 412 can vary as a function of distance 450 (z-axis) between the RFID apparatus 100 and the fixture 401. That is, the line separation may decrease as the RFID apparatus 100 is moved closer to the fixture 401 and line separation may increase as the RFID apparatus 100 is moved further away from the fixture 401. Further, the offset distance between the scan path 410 and RFID boresight path 412 may vary as the orientation of the RFID apparatus changes. At a first orientation change 441 in can path 410 the resulting RFID boresight path 412 depicts a path change 442 differing from scan path 410 at orientation change 441. At a second orientation change 443 of scan path 410 the resulting RFID boresight path 412 depicts yet another different path change 444.

In one embodiment, at least one decodable indicia 423 is disposed (i.e., attached) to the fixture 401. The fixture 401 may include external edges 408 on sides thereof and may also include multiple shelves 402 each holding multiple objects such as 405, 406 and 409. In one embodiment, scan path 410 represents a centroid 430 of the image captured by the RFID apparatus motion sensing device (i.e., a center of each image periodically acquired by the camera 353) as the user moves the RFID apparatus 100 with respect to the fixture 401. In another embodiment, scan path 410 represents the motion of a projected axis of the IMU 350 frame of reference (i.e. such as the z-axis) on an imaginary 2-D vertical plane at the front of the fixture 401.

Figure 5:
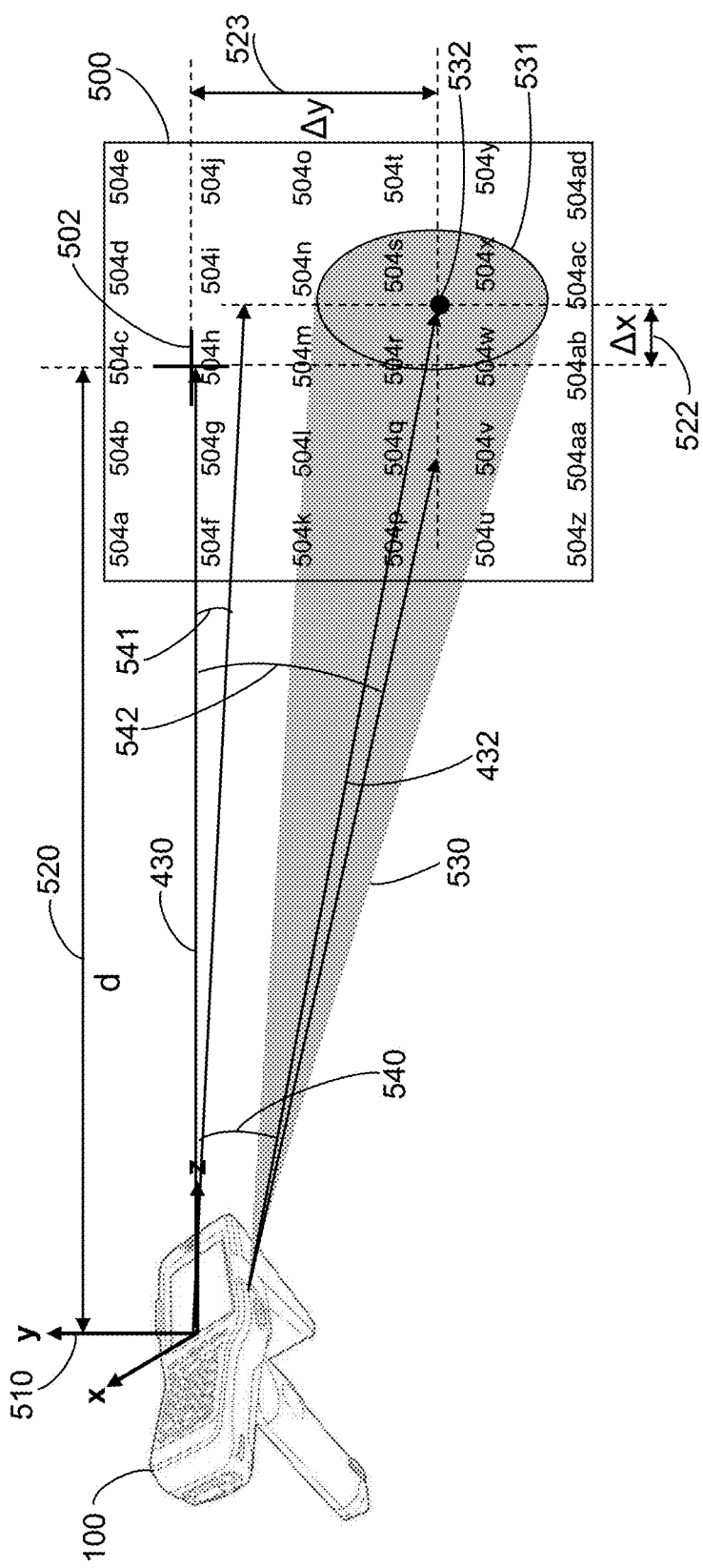
FIG. 5 illustrates a method for determining alignment differences of an RID apparatus scan path.

FIG. 5 illustrates aspects of the system for calibrating an RFID apparatus, including the RFID apparatus 100 and the RFID tag array 500. A virtual frame of reference 510 for the motion sensing device such as an IMU 350 or camera 353 is shown for one embodiment. The position and orientation of the frame of reference 510 within the RFID apparatus 100 is determined by the design of the RFID apparatus 100 and may vary within one or more copies of the RFID apparatus 100 of one design, and among one or more RFID apparatus 100 having different designs. In one embodiment of RFID apparatus 100 the frame of reference of the motion sensing device is a right-hand orthogonal coordinate system having one axis (i.e. such as the z-axis 430) extending out the front of the RFID apparatus 100.

A separation distance 520 between the RFID apparatus 100 and the RFID tag array 500 may be less than a predetermined distance, with a maximum separation distance 520 determined by the separation distance 520 beyond which RFID apparatus 100 is unable to read one or more RFID tags 504a-504ad on RFID tag array 500. RFID apparatus 100 may be positioned at the separation distance 520 manually or automatically, and retained in the position manually or mechanically, such as with a fixture 1702.

In one embodiment of the calibration system, the RFID tag array 500 includes a visual reference mark 502 and at least one RFID tag 504a-504ad disposed on the RFID tag array 500. The visible reference mark 502 provides an alignment point for aligning the RFID apparatus 100 using the motion sensing device, such as an IMU 350 or camera 353. Characteristics of the visible reference mark 502 (i.e. size, design, color, orientation, etc.) may be selected without limitation to optimize the accuracy of aligning the RFID apparatus 100 using the motion sensing device such as an IMU 350 or camera 353. Further, the encoded indicia reader (EIR) 330 may include an illumination source (i.e. laser, LED, etc.) for scanning barcodes. Alignment of the RFID apparatus 100 may be assisted by enabling the illumination source of the EIR 330 to project a visible light pattern on the RFID tag array 500. By aligning the RFID apparatus 100 such that the projected visible light pattern is in part parallel to, and at least partially overlaps, the visible reference mark 502, the alignment process for the RFID apparatus 100 is assisted. In one embodiment of RFID apparatus 100, the extended axis 430 of the frame of reference of the motion sensing device is parallel to, and coincident with, the projected visible light pattern from the EIR 330, with no alignment difference. In another embodiment of RFID apparatus 100, the extended axis 430 of the frame of reference of the motion sensing device is not parallel to the projected visible light pattern from EIR 330, resulting in an alignment difference. Each of the RFID tags 504a-504ad contains information readable by the RFID apparatus 100, including; a unique identifier value, and information describing the position of each RFID tag 504a-504ad. Such position information may be encoded with respect to one of several coordinate systems (i.e. Cartesian, polar, etc.) and may describe an absolute position on the RFID tag array 500 or position of the RFID tag 504a-504ad relative to the visible reference mark 502, all without limitation. Preferentially, all RFID tags 504a-504ad exhibit similar responsiveness to the RFID apparatus 100 when the RFID reader 333 causes a signal to be radiated by the RFID antenna 338 when reading RFID tags 504aa-504ad for the purpose of determining the RFID boresight 432.

In one embodiment, one or more RFID tags 504a-504ad are uniformly distributed in two dimensions across the surface of the RFID tag array 500, with each RFID tag 504a-504ad including position information readable by the RFID apparatus 100 encoded as a set of values representing the physical distance along each axis of a Cartesian coordinate system from the visible reference mark 502 to the RFID tag 504a-504ad, with the origin of the Cartesian coordinate system established by the center of the visible reference mark 502. For example, defining the horizontal spacing between adjacent RFID tags 504a and 504b as a physical distance of 1 unit, and the vertical spacing between adjacent RFID tags 504a and 504f as a physical distance of 1 unit, and with the origin of the Cartesian coordinate system at the center of the visigle reference mark 502, then in one embodiment the set of position values for RFID tag 504a is (−2, +1) since RFID tag 504a is two units left and one unit above the origin of the Cartesian coordinate system.

The RFID boresight 432 is determined when the RFID apparatus 100 reads the signal strength of one or more RFID tags which may be used to determine a heat map of the RFID antenna radiation pattern 531 on the RFID array 500. For example, the RFID apparatus 100 determines the signal strengths RFID tags 504r, 504s, 504w and 504x are similar, and acquires the Cartesian coordinate position information values; RFID tag 504r has a set of values (0, −2), RFID tag 504s has a set of values (+1, −2), RFID tag 504w has a set of values (0, −3) and RFID tag 504x has a set of values (+1, −3). The four sets of position values describe a square, with a centroid 532 at (+0.5, −2.5). A ray drawn from the center of the RFID antenna 338 to the centroid 532 describes the RFID boresight 432 for this example. Other RFID boresights 432 may result from various combinations of the RFID apparatus 100 reading RFID tags with various signal strengths and position information, and other shapes of the RFID antenna radiation pattern 531 on the RFID tag array 500 are possible, all without limitation.

The alignment difference 540 depicts the angular relationship between the extended axis 430 of the motion sensing device of the RFID apparatus 100, when this extended axis is aligned with the visible reference mark 502 on the RFID tag array 500, and the RFID boresight 432. The prior art depicts a scan path 410 determined using data from the RFID apparatus 100 motion sensing device, such as an IMU 350 or camera 353, which differs from the path 412 followed by the RFID boresight 432 due to the alignment difference 540. In one embodiment, the alignment difference 540 may be determined using trigonometry, by decomposing the alignment difference 540 into orthogonal component angles. For example, a 2-D Cartesian coordinate system is used to determine positions of the visible reference mark 502 and RFID tags 504a-504ad on the RFID tag array 500, with the origin of the Cartesian coordinate system at the center of the visible reference mark 502. The alignment difference 540 between the extended axis 430 of the motion sensing device, aligned with the visible reference mark 502, and the RFID boresight 432 is composed of a horizontal component angle 541 having a horizontal position difference 522 and a vertical component angle 542 having a vertical position difference 523. Computation of the horizontal component angle may be performed with trigonometry using the determined horizontal position difference 522 and the separation distance 520 between the RFID apparatus as two sides of a right triangle. Computation of the vertical component angle may be performed with trigonometry using the determined vertical position difference 523 and the separation distance 520 between the RFID apparatus as two sides of a right triangle. Computed horizontal and vertical component angle values may be stored for use by the RFID apparatus 100 to adjust scan path 410, determined using motion sensing device data, is adjusted to more accurately indicate the path 412 of the RFID reader antenna radiation pattern 531 when the RFID apparatus 100 is used to acquire RFID tags (i.e. located on physical structures). Other coordinate systems, separation distance 520, RFID tag array 500 size, number and position of RFID tags 504a-504ad are possible, all without limitation.

Figure 6B:
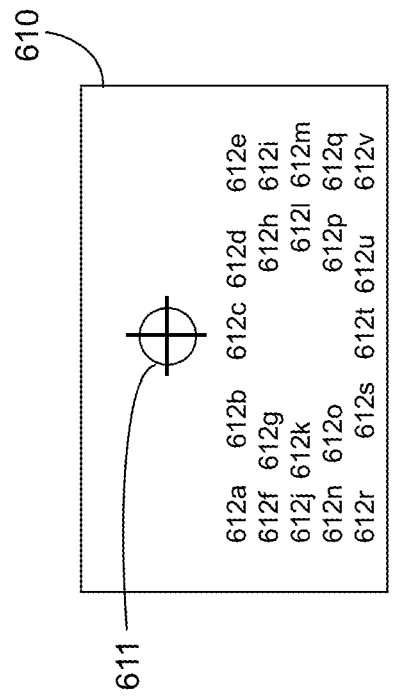
FIGS. 6A and 6B illustrate RFID tag arrays according to various embodiments.
Figure 6A:
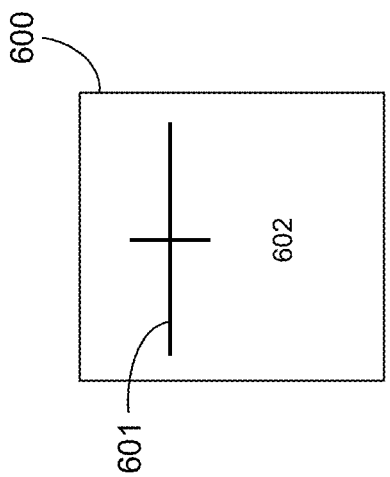

FIGS. 6A and 6B illustrate examples of other aspects of an RFID tag array. The RFID tag array 600 has different physical dimensions, a different visible reference mark and a different configuration of RFID tags than RFID tag array 610. RFID tag array 600 may be used, for example, to perform an inclusion verification test of predetermined alignment calibration values for the RFID apparatus 100 when the signal strength of RFID tag 602 is included in a predetermined range of signal strength values during the calibration process, indicating the alignment difference between an extended sensing axis 430 of the motion sensing device and the RFID boresight 432 are within a predetermined range of values. RFID tag array 610 may be used, for example, to perform an exclusion verification test of predetermined alignment calibration values for the RFID apparatus 100 when the signal strength of of one or more RFID tags 612a-612v is excluded from a predetermined range of signal strength values during the calibration process, indicating the alignment difference between an extended sensing axis 430 of the motion sensing device and the RFID boresight 432 are within a predetermined range of values. Visible alignment mark 601 is asymmetrical to assist the motion sensing device (i.e. such as a microprocessor 310 with memory 320, or an image processing module 388) to distinguish between the orthogonal axes during the alignment process. Visible alignment mark 611 includes different geometric shapes which may also be used to assist the motion sensing device (i.e. such as a microprocessor 310 with memory 320, or an image processing module 388) during the alignment process. Other RFID tag array shapes, RFID tag counts and configurations, visible reference mark design and relationship between the visible reference mark and one or more RFID tags are possible, all without limitation.

Figure 7B:
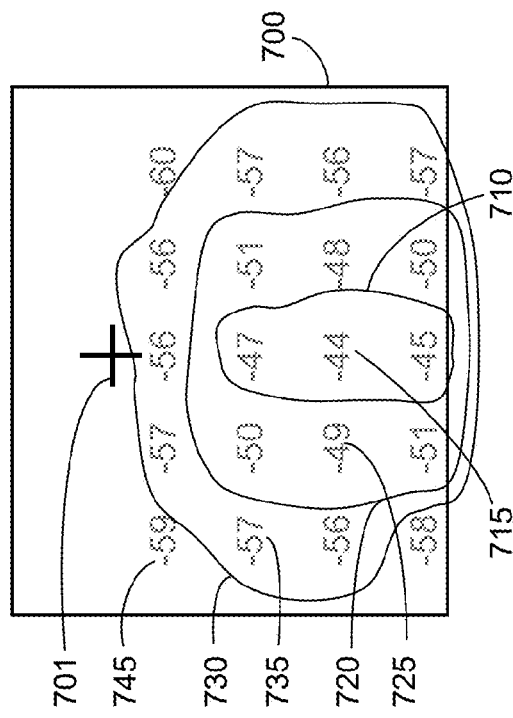
FIGS. 7A and 7B illustrate RFID tag signal strength values and heat map for a selected set of angles, including at least a vertical angle, of the motion sensing device frame of reference relative to an RFID tag array for an inclusion calibration mode according to one embodiment.
Figure 7A:
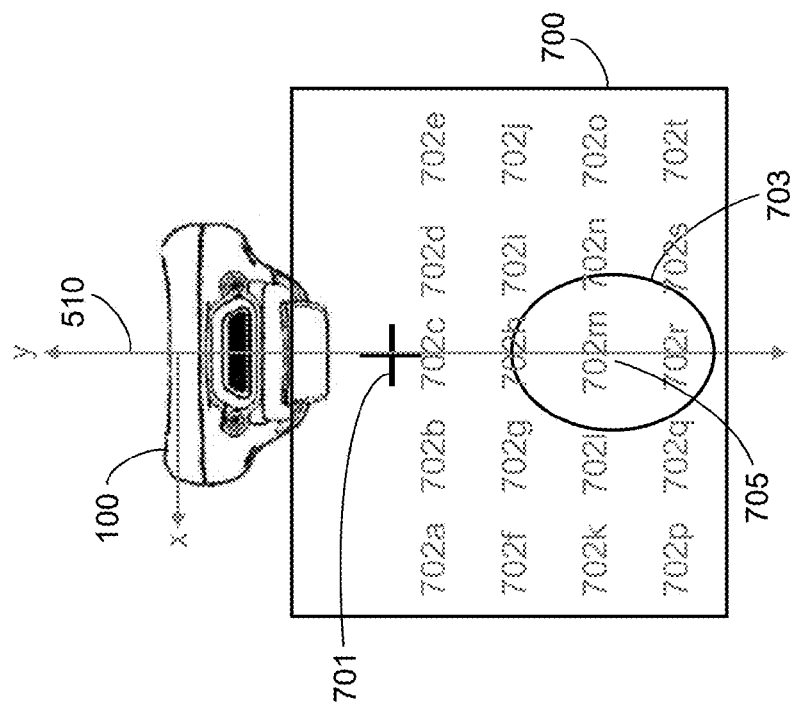

FIGS. 7A and 7B illustrate aspects of determining a heat map of a predicted RFID reader antenna radiation pattern 703 intersecting the plane of the RFID tag array 700. In one embodiment, the frame of reference 510 of the motion sensing device is described by a right-hand orthogonal coordinate system (i.e. x-, y-, z-axes). FIG. 7A illustrates a view looking from the RFID apparatus 100 towards the RFID tag array 700 along one axis (i.e. the z-axis, not shown) of the motion sensing device which intersects the center of the visible reference mark 701. FIG. 7A also depicts the remaining two axes of the frame of reference 510 of the motion sensing device with the vertical axis of 510 (i.e. y-axis) extended downward to illustrate a parallel and overlapping relationship with the vertical axis of the visible reference mark 701. The described relationship of the RFID apparatus 100 motion sensing device frame of reference 510 with the visible reference mark 701 on RFID tag array 700 is a preferred alignment during the alignment calibration process, but the preferred alignment is not a limiting aspect of the process.

Responsive to the RFID reader device 333 transmitting a signal using the one or more RFID antennas 338, the RFID apparatus 100 may acquire data sets including the signal strength and data values stored in one or more RFID tags 702a-702t. The data values are unique to each RFID tag 702a-702t and contain at least information describing the position of the responding one or more RFID tags 702a-702t on the RFID tag array 700. The RFID apparatus 100 processes the one or more data sets of signal strength and position information to generate a heat map, including one or more regions of RFID tags with similar signal strength values, such as heat map regions 710, 720 and 730 illustrated in FIG. 7B. In one embodiment, each region of the heat map includes one or more RFID tags 702a-702t with measured signal strength values in a predetermined range for the region, and the ranges between regions may be contiguous. For example, heat map region 710 includes RFID tags 702h, 702m, 702r, all with signal strength values in the range of −44 to −47. In one embodiment, the units of signal strength are decibels relative to a one milliwatt (dBm), which represent higher signal strengths as larger signed values than lower signal strengths (i.e. −44 dBm represents a higher signal strength than −47 dBm). Further, heat map region 720 includes RFID tags with signal strengths between −48 dBm and −51 dBm, and heat map region 720 includes RFID tags with signal strengths between −52 dBm and −57 dBm. Since the purpose of the heat map is to partition sets of RFID tags according to measured signal strength, those RFID tags with signal strengths below the minimum signal strength of interest, such as RFID tags 702a, 702b, etc. are placed in an unlabeled region. Other numbers of heat map regions, ranges of signal strength, methods of representing RFID tag position, and signal strength measurement units are possible, all without limit.

In one embodiment, the heat map region of interest is described by a range of signal strengths determined by one or more of parameters affecting measured RFID tag signal strength at the RFID antenna 338; RFID reader device 333 transmit power level, RFID antenna 338 gain and radiation pattern, design and orientation of RFID inlay in RFID tags 702a-702t, orientation of RFID apparatus 100 relative to RFID tag array 700, and distance between RFID apparatus 100 and RFID tag array 700, For a calibration process using an inclusion mode RFID tag array such as RFID tag array 500 or 600, the heat map region of interest contains RFID tags with signal strengths at least as high as the minimum signal strength value determined for the range in a selected heat map region, for use in determining the RFID boresight 432. For a calibration process using an exclusion mode RFID tag array such as RFID tag array 610, the heat map region of interest contains RFID tags with signal strengths lower than the maximum signal strength value determined for the range in a selected heat map region, to determine whether the RFID boresight 432 intersects the RFID tag array 610 where there are no RFID tags 612a-612v.

Illustrated in FIG. 7B, for example, are RFID tag signal strength measurements of RFID tags 702a-702t on inclusion mode RFID tag array 700, which are processed by RFID apparatus 100 into three labeled heat map regions 710, 720, 730. Each measured RFID signal strength value illustrated in FIG. 7B corresponds to a unique RFID tag on RFID tag array 700. For example, RFID tag 702a corresponds to a signal strength measurement 745 of −59 dBm, RFID tag 702f corresponds to a measured signal strength 735 of −57 dBm, RFID tag 702l corresponds to a measured signal strength 725 of −49 dBm, and RFID tag 702m corresponds to a measured signal strength 715 of −44 dBm. For an inclusion mode calibration process, the significant heat map region contains the RFID tags with the highest signal strength values, such as heat map region 710. RFID apparatus 100 processes the signal strength values and position information from RFID tags 702a-702t to determine an approximate perimeter of heat map region 710. RFID apparatus 100 further processes signal strength and position information from RFID tags 702h, 702m, 702r to determine a centroid (i.e. geometric center) of heat map region 710, which may be used to establish an RFID boresight 432. The resulting heat map region 710 approximates the predicted RFID antenna radiation pattern 702 with a centroid 705. Due to variations in RFID antenna radiation pattern resulting from external objects (i.e. human body, conducting materials, etc.), it may be necessary to determine the RFID boresight 432.

In one embodiment of the inclusion alignment calibration process, the predicted location of the RFID antenna radiation pattern 702 having an RFID boresight 705 on the RFID tag array 700 uses an RFID tag array 600, with the measured signal strength of RFID tag 602 exceeding a predetermined signal strength value indicating the determined RFID boresight is similar to the predicted RFID boresight for the calibration of an RFID apparatus 100. In another embodiment of the inclusion alignment calibration process, the predicted location of the RFID antenna radiation pattern 702 having an RFID boresight 705 on the RFID tag array 700 uses an RFID tag array 700, with the measured signal strength of RFID tags 702h, 702m, 702r exceeding a predetermined signal strength value resulting in the determination of a heat map region 710 with centroid 715 indicating the determined RFID boresight is similar to the predicted RFID boresight for the calibration of an RFID apparatus 100. Other combinations of one or more RFID tags describing one or more heat map regions are possible, all without limitation.

Figure 8B:
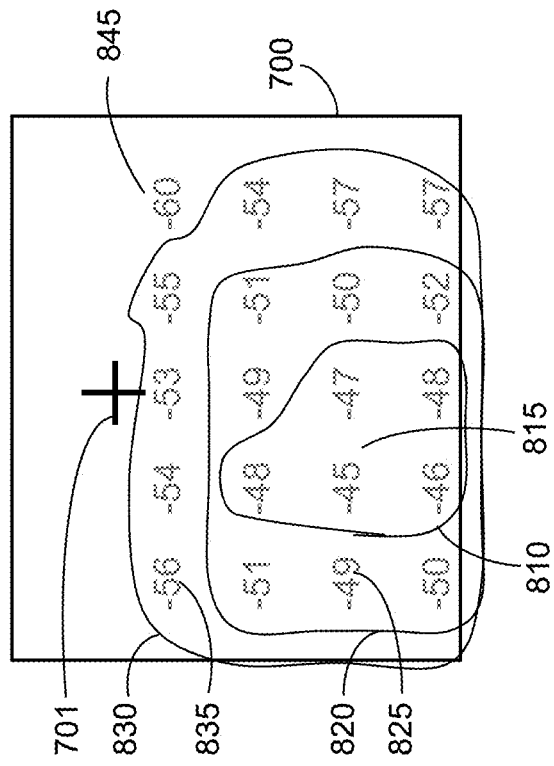
FIGS. 8A and 8B illustrate RFID tag signal strength values and heat map for a selected set of angles, including at least a horizontal angle, of the motion sensing device frame of reference relative to an RFID tag array for an inclusion calibration mode according to one embodiment.
Figure 8A:
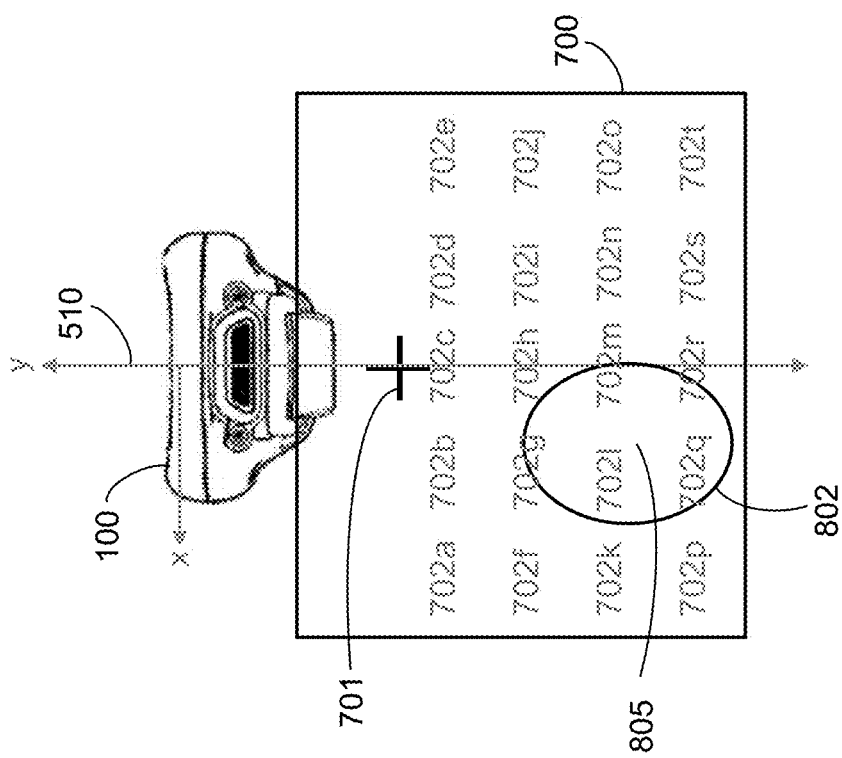

FIGS. 8A and 8B illustrate aspects of inclusion mode alignment calibration of an RFID apparatus 100 in a preferred alignment position having at least a horizontal alignment offset between the motion sensing device frame of reference 510 with extended axis 430 and the RFID boresight 432, resulting in an alignment difference 540, which may be composed of one or more component angular alignment differences determined by one or more component alignment offsets, such as horizontal alignment offset 522 and vertical alignment offset 523. FIG. 8A illustrates the position of the centroid 805 of the predicted RFID antenna radiation pattern 802 intersecting the RFID tag array 700 is left of the vertical axis (i.e. y-axis) of the frame of reference 510 of the motion sensing device. Also illustrated in FIG. 8A, the centroid 805 and center of the visible reference mark 701 are not coincident, due to RFID apparatus 100 having a vertical alignment offset. FIG. 8B illustrates the heat map regions resulting from signal strength measurements for RFID tags 702a-702t, responsive to the RFID apparatus 100 using the RFID reader device 333 and one or more RFID antennas 338 to acquire data sets from one or more RFID tags 702a-702t including at least a signal strength measurement and information describing the position of the RFID tag 702a-702t on the RFID tag array 700. For example, RFID apparatus 100 may process the one or more data sets from RFID tags 702a-702t to determine the heat map regions 810, 820, 830 using at least RFID tag 702a having a signal strength measurement 835 of −56 dBm to determine a heat map region 830, RFID tag 702k having a signal strength measurement 825 of −49 dBm to determine heat map region 820, and RFID tag 702l having a signal strength measurement of −45 dBm to determine heat map region 810. Further, RFID apparatus processes the signal strength measurement values and position information for RFID tags 702g, 702l, 702m, 702q, 702r to determine the centroid 815 of heat map region 810 representing the RFID boresight for RFID apparatus 100.

FIGS. 9A and 9B illustrate aspects of inclusion mode alignment calibration of an RFID apparatus 100 not in a preferred alignment position having no horizontal alignment offset between the motion sensing device frame of reference 510 with extended axis 430 and the RFID boresight 432. FIG. 9A illustrates the position of the centroid 905 of the predicted RFID antenna radiation pattern 902 intersecting the RFID tag array 700 having a frame of reference 510 vertical axis (i.e. y-axis) not parallel with the visible reference mark 701 by an angle 907 measured by the motion sensing device (i.e. IMU 350 or camera 353). FIG. 8B illustrates the heat map regions resulting from signal strength measurements for RFID tags 702a-702t, responsive to the RFID apparatus 100 using the RFID reader device 333 and one or more RFID antennas 338 to acquire data sets from one or more RFID tags 702a-702t including at least a signal strength measurement and information describing the position of the RFID tag 702a-702t on the RFID tag array 700. For example, RFID apparatus 100 may process the one or more data sets from RFID tags 702a-702t to determine the heat map regions 910, 920, 930 using at least RFID tag 702l having a signal strength measurement 935 of −53 dBm to determine a heat map region 930, RFID tag 702r having a signal strength measurement 925 of −52 dBm to determine heat map region 920, and RFID tag 702n having a signal strength measurement of −45 dBm to determine heat map region 910. Further, RFID apparatus processes the signal strength measurement values and position information for RFID tags 702i, 702m, 702n, 702s to determine the centroid 915 of heat map region 910 representing the RFID boresight for RFID apparatus 100. The RFID apparatus 100 adjusts the determined position of the RFID boresight on the RFID tag array 700 using trigonometry and the angle 907 measured by the motion sensing device. In this example, the determined alignment calibration values are similar to the alignment calibration values determined for the example illustrated in FIGS. 8A and 8B. Other combinations of RFID apparatus 100 orientation angles and position relative to the RFID tag array 700 are possible, all without limitation.

FIGS. 10A and 10B illustrate aspects of exclusion mode alignment calibration of an RFID apparatus 100 in a preferred alignment position having at least a vertical alignment offset between the motion sensing device frame of reference 510 with extended axis 430 and the RFID boresight 432, resulting in an alignment difference 540, which may be composed of one or more component angular alignment differences determined by one or more component alignment offsets, such as horizontal alignment offset 522 and vertical alignment offset 523. FIG. 10A illustrates the separation between the center of the visible reference mark 1001 and the centroid 1005, of the predicted RFID antenna radiation pattern 1002 intersecting the RFID tag array 1000, due to a vertical alignment offset 522. FIG. 10B illustrates the heat map regions resulting from signal strength measurements for RFID tags 1003a-1003q, responsive to the RFID apparatus 100 using the RFID reader device 333 and one or more RFID antennas 338 to acquire data sets from one or more RFID tags 1003a-1003q including at least a signal strength measurement and information describing the position of each responding RFID tag 1003a-1003q on the RFID tag array 1000. For example, RFID apparatus 100 may process the one or more data sets from RFID tags 1003a-1003q to determine the heat map regions 1020, 1030 using at least RFID tag 1003f having a signal strength measurement 1035 of −57 dBm to determine a heat map region 1030, and RFID tag 1003k having a signal strength measurement 1025 of −49 dBm to determine heat map region 1020. Further, RFID apparatus processes the signal strength measurement values and position information for RFID tags 1003g, 1003h, 1003k, 1003l, 1003o, 1003p to determine the centroid 1015 of heat map region 1020 representing the RFID boresight for RFID apparatus 100. For the exclusion mode alignment process, the RFID boresight determined by centroid 1015 is confirmed in all RFID tags in heat map zone 1020 and heat map zone 1030 have signal strength measurement values less than a predetermined value, indicating the RFID boresight (i.e. where the highest signal strength measurement values should occur) intersects the RFID tag array 1000 on the area of the RFID tag array 1000 where no RFID tags 1003a-1003q are located. In one embodiment, RFID apparatus 100 may use predetermined alignment calibration values when the RFID boresight is determined in the manner described. In another embodiment, RFID apparatus 100 may determine the alignment calibration values, at least in part, from the position of the determined centroid 1015, in a manner similar to inclusion mode alignment calibration. Other numbers and arrangements of RFID tags, RFID tag array shape, and RFID boresight determination are possible, all without limitation.

FIGS. 11A and 11B illustrate aspects of inclusion mode alignment calibration of an RFID apparatus 100 in a preferred alignment position having at least two primary lobes in the RFID antenna radiation pattern 1102a, 1102b, each having at least a horizontal alignment offset between the motion sensing device frame of reference 510 with extended axis 430 and the RFID boresight 432, resulting in an alignment difference 540, which may be composed of one or more component angular alignment differences determined by one or more component alignment offsets, such as horizontal alignment offset 522 and vertical alignment offset 523. FIG. 11A illustrates the position of the centroids 1105a, 1105b of the predicted RFID antenna radiation pattern 1102a, 1102b intersecting the RFID tag array 700 to the left and right of the vertical axis (i.e. y-axis) of the frame of reference 510 of the motion sensing device. Also illustrated in FIG. 11A, the centroids 1105a, 1105b and center of the visible reference mark 701 are not coincident, due to RFID apparatus 100 having at least a vertical alignment offset. FIG. 11B illustrates the heat map regions resulting from signal strength measurements for RFID tags 702a-702t, responsive to the RFID apparatus 100 using the RFID reader device 333 and one or more RFID antennas 338 to acquire data sets from one or more RFID tags 702a-702t including at least a signal strength measurement and information describing the position of the RFID tag 702a-702t on the RFID tag array 700. For example, RFID apparatus 100 may process the one or more data sets from RFID tags 702a-702t to determine the heat map regions 1110a, 1110b, 1120a, 1120b using at least RFID tag 702k having a signal strength measurement 1125a of −49 dBm to determine a heat map region 1120a, RFID tag 702o having a signal strength measurement 1125b of −47 dBm to determine heat map region 1120b, RFID tag 702m having a signal strength measurement of −47 dBm, to determine heat map region 1110a and RFID, and RFID tag 702n having a signal strength measurement of −43 dBm to determine heat map region 1110b. Further, RFID apparatus processes the signal strength measurement values and position information for RFID tags 702l, 702m to determine the centroid 1115a of heat map region 1110a representing at least one RFID boresight for RFID apparatus 100, and RFID tag 702n to determine a centroid 1115b of heat map region 1110b representing at least a second RFID boresight for RFID apparatus 100. Further, RFID apparatus 100 may process the two or more RFID boresights 1115a, 1115b to determine a single effective RFID boresight 1140. Other numbers and positions of two or more RFID boresights, and other single effective RFID boresights are possible, all without limitation.

Figure 12:
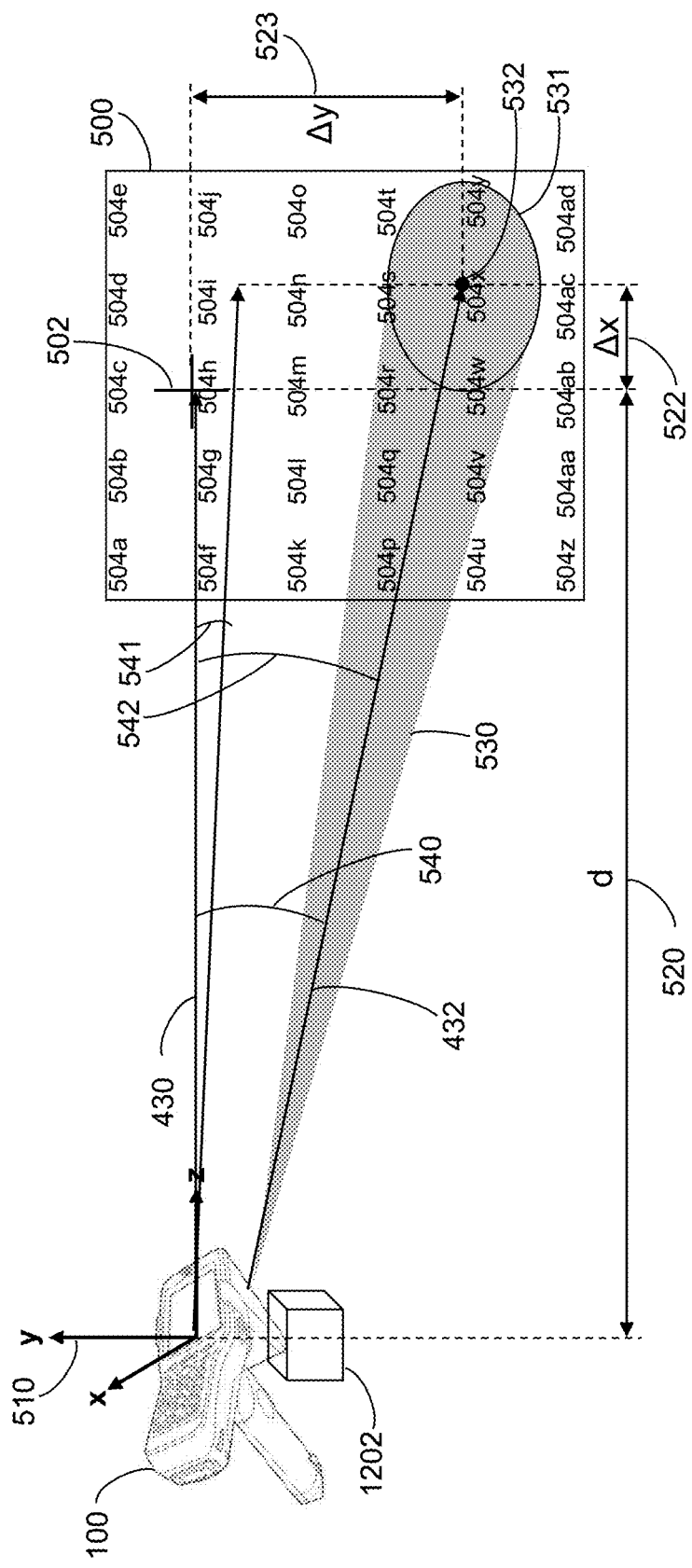
FIG. 12 illustrates the positioning of an RFID apparatus for calibration method using a fixture according to one embodiment.

FIG. 12 illustrates aspects alignment calibration of an RFID apparatus 100 of FIG. 5 having the RFID apparatus 100 retained with a determined position and orientation with respect to the visible reference mark 502 on the RFID tag array 500 using a calibration fixture 1202. In one embodiment, alignment fixture 1202 retains the RFID apparatus 100 in a stationary, predetermined position and orientation. In another embodiment, alignment fixture 1202 provides for variations in position and orientation of the RFID apparatus 100 including a locking method to cause the RFID apparatus 100 to be retained in a stationary, selected position and orientation. In another embodiment, the alignment fixture 1202 may be mounted on a moveable structure having manual or automatic control of position and orientation of the alignment fixture 1202. In another embodiment, the alignment fixture 1202 includes one or more interface devices; including, but not limited to; one or more user interface input devices (i.e. button, switch, touchpad, etc.) to enable the user to provide control input to the alignment calibration process without touching the RFID apparatus 100, one or more user interface output devices (i.e. light, LED, buzzer, LCD display, etc.) for depicting data and information to the user, one or more electrical signal interfaces (i.e. serial, parallel, bus, USB, wireless, wired, optical, etc.) for interfacing the RFID apparatus 100 to an external device (i.e. such as a network, computer, etc.) for remote control and monitoring of the alignment calibration process. Other combinations of alignment calibration modes, input devices, output devices, and interface devices are possible, all without limitation.

Figure 13:
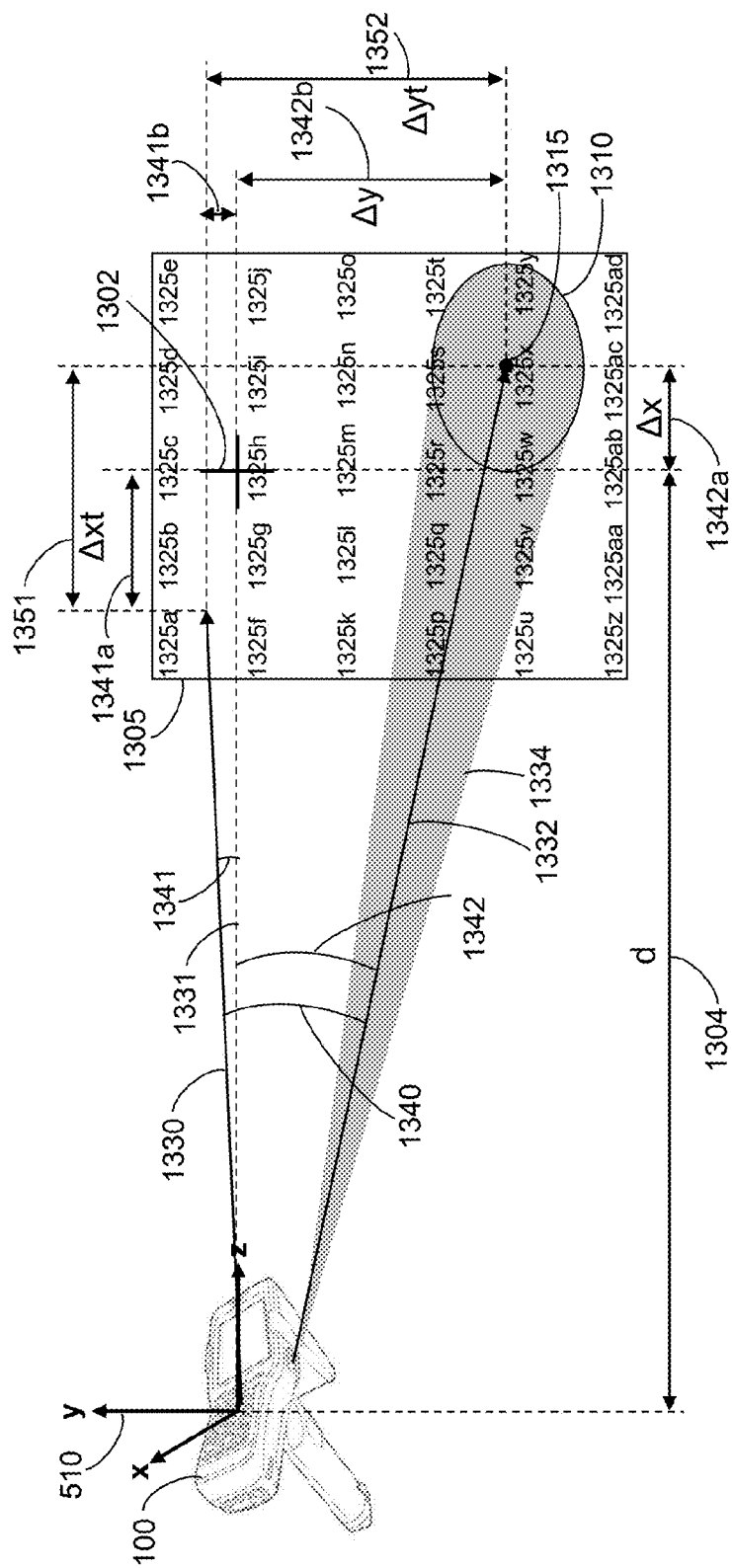
FIG. 13 illustrates the calibration method for an RFID apparatus having one or more alignment differences between at least one sensing acis of the motion sensing device and the visisble reference mark on the RFID array according to one embodiment.
Figure 14A:
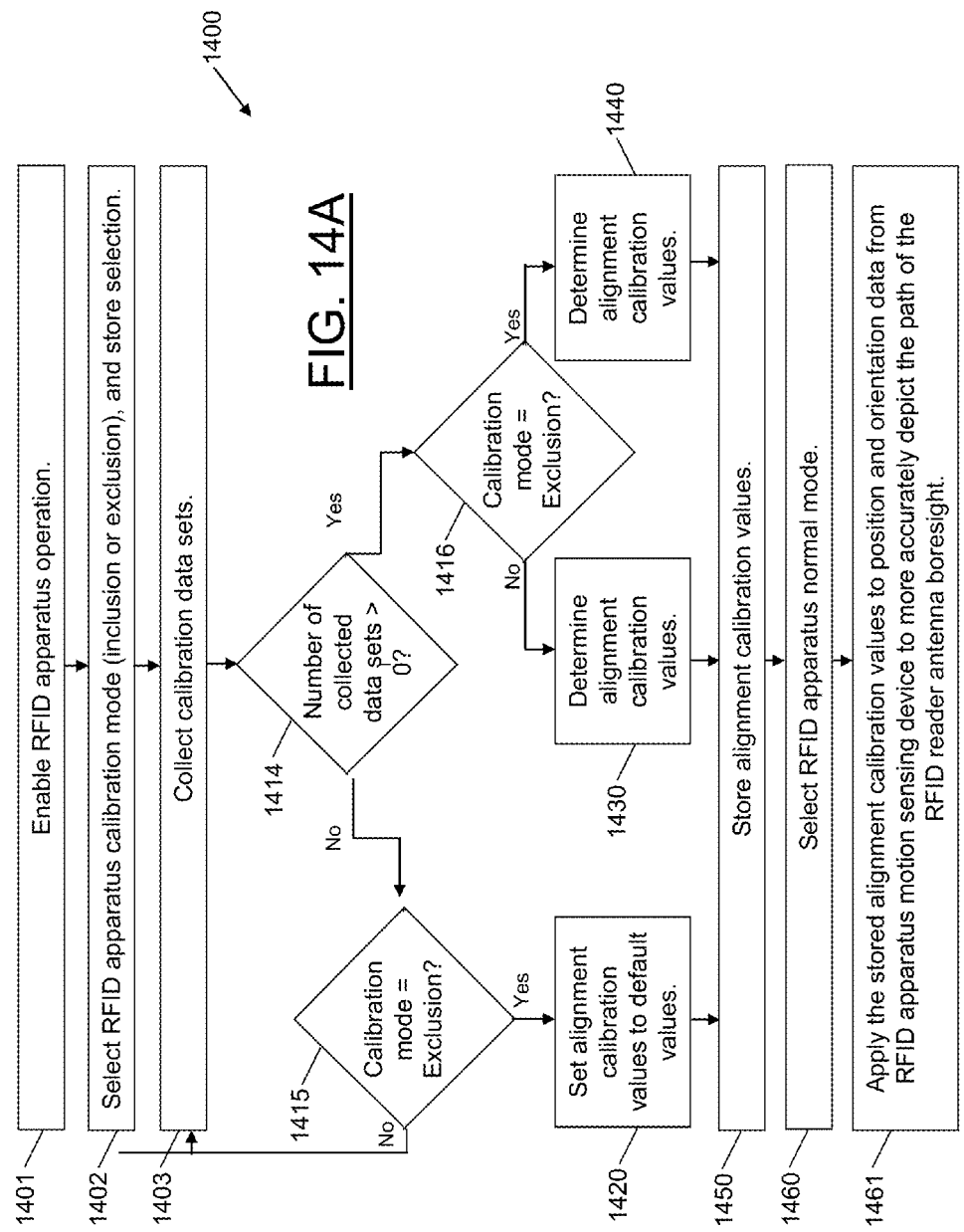
FIGS. 14A, 14B, 14C and 14D depict a workflow of one embodiment.
Figure 14B:
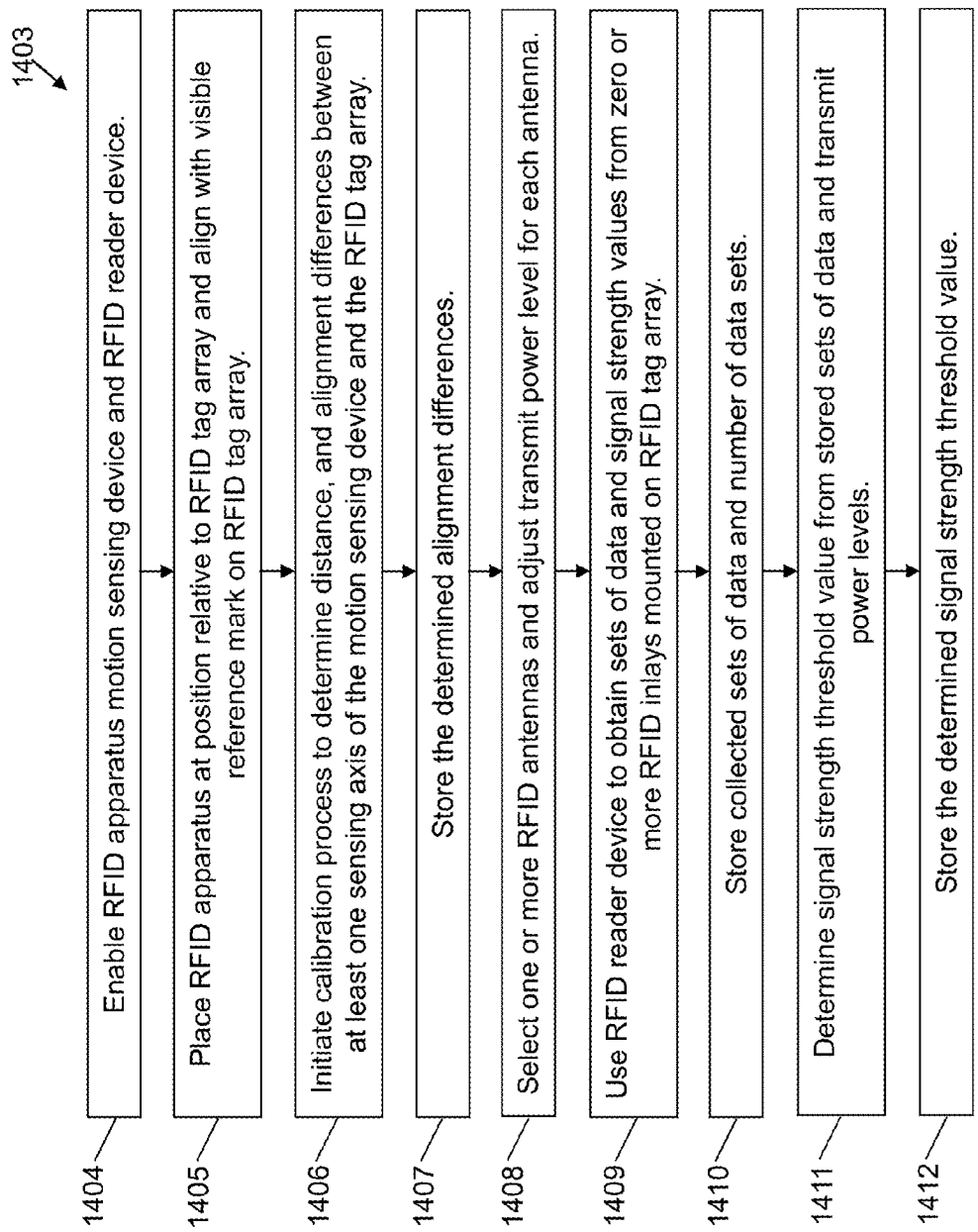
Figure 14C:
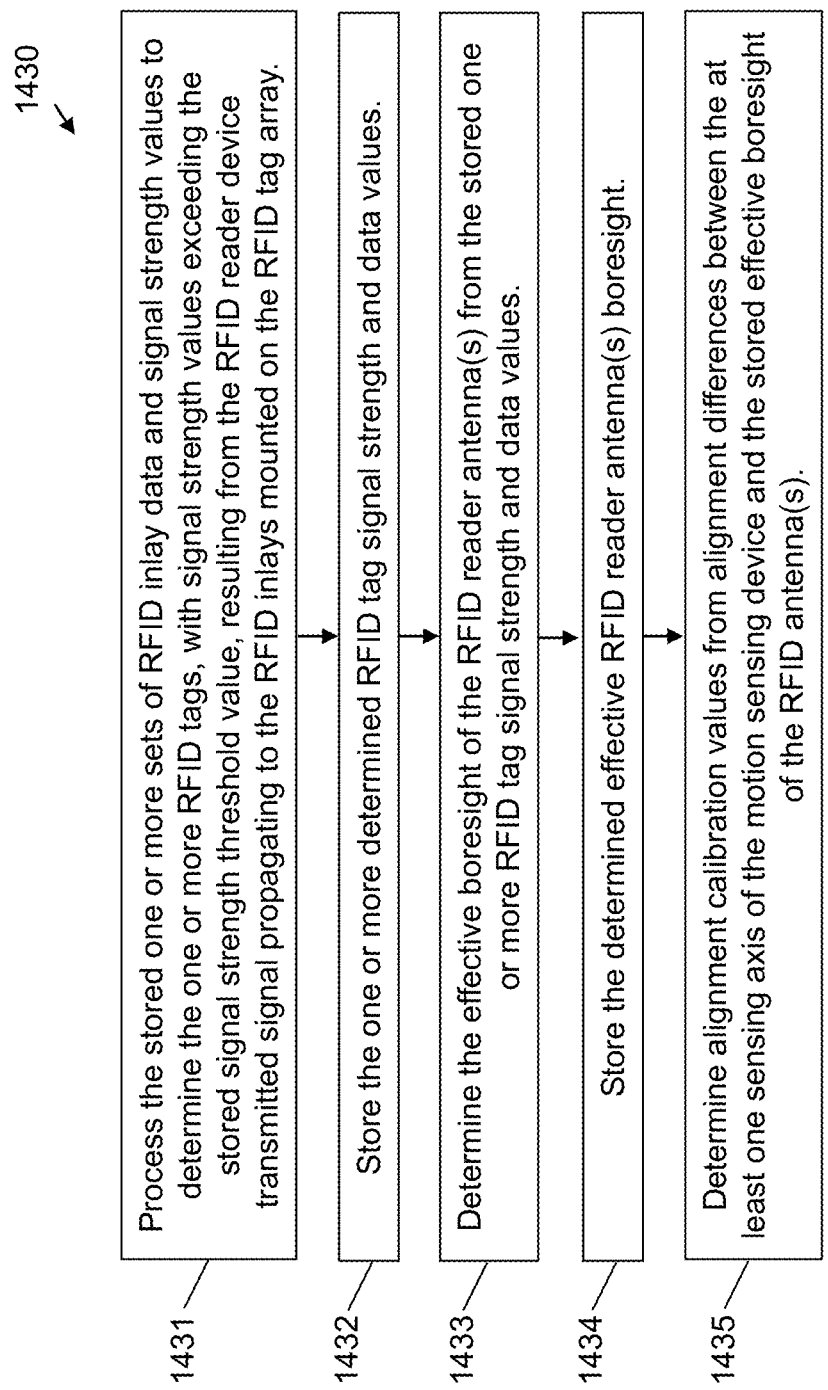
Figure 14D:
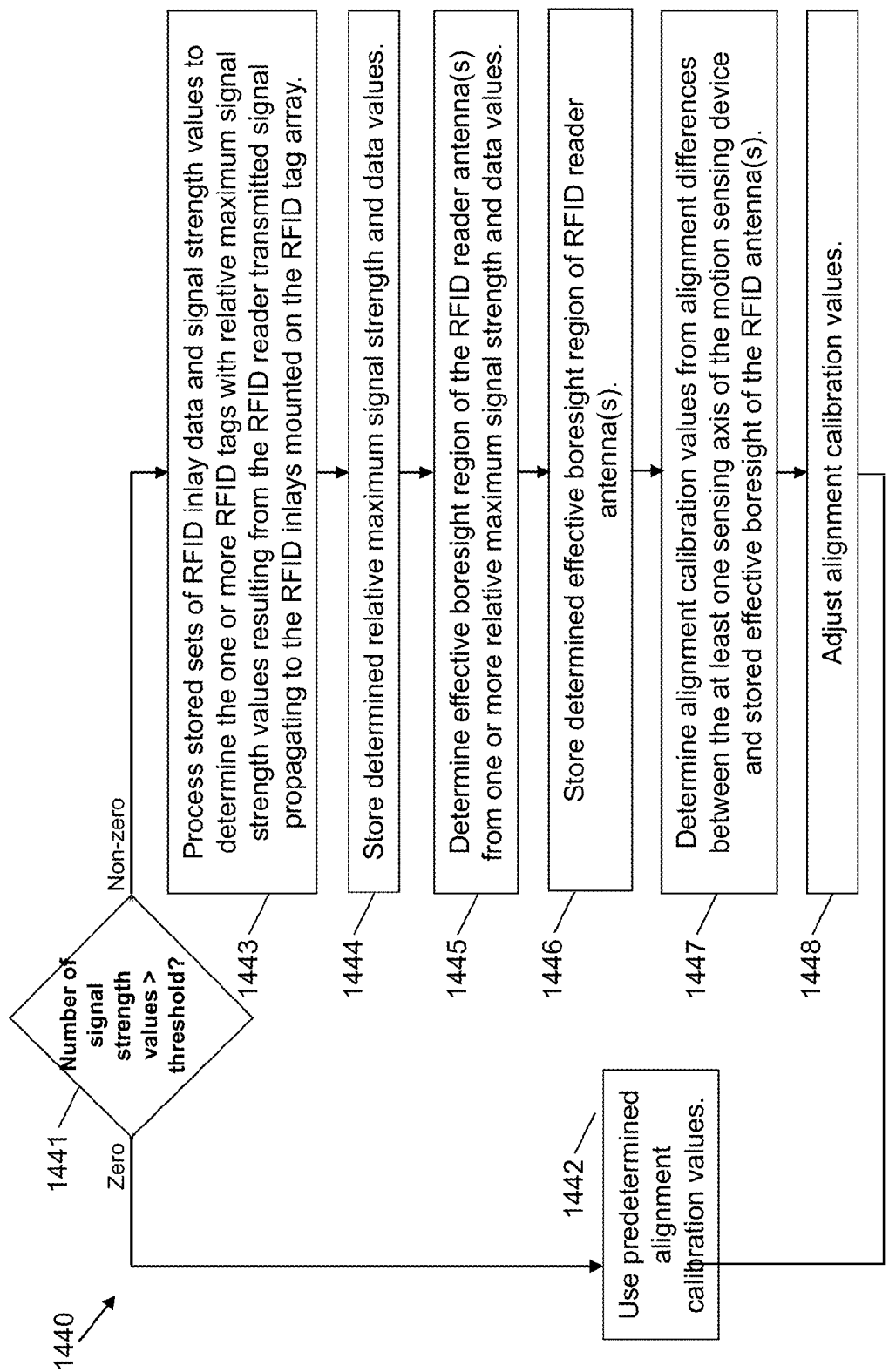

FIG. 13 illustrates aspects of alignment calibration of an RFID apparatus 100 in a non-preferred alignment position and orientation, having one or more alignment differences 1341 between at least one axis of the motion sensing device frame of reference 510, such as axis 1330 (i.e. z-axis), and a baseline 1331 drawn between the motion sensing device frame of reference 510 origin and visible reference mark 1302 on RFID tag array 1305. Alignment difference 1341 may be composed of one or more angular alignment differences (not shown) resulting from one or more alignment offsets, such as a horizontal alignment offset 1341a and a vertical alignment offset 1341b. RFID antenna radiation pattern 1334 intersecting the RFID tag array 1395 has at least one heat map region 1310 with a centroid 1315 indicating the RFID boresight 1332 for an RFID apparatus 100 transmitting a signal using the RFID reader device 333 including one or more RFID antennas 338 with a selected transmit power level for each antenna. RFID boresight 13323 may have one or more angular alignment differences from baseline 1331 due to one of more alignment offsets, such as a horizontal alignment offset 1342a and a vertical alignment offset 1342b. The RFID apparatus 100 alignment difference 1340 may be composed on one or more angular alignment differences, which may be computed from appropriately combining the one or more component alignment offsets, such as a total horizontal alignment offset 1351 and a total vertical offset 1352. Other combinations of angular alignment differences, alignment offsets, RFID boresights and RFID apparatus position and orientation are possible, all without limitation.

FIGS. 14A, 14B, 14C and 14D illustrate a method 1400 relating to determining alignment calibration values for an RFID apparatus 100 used for scanning a physical structure such as a retail display for RFID tags according to some embodiments. In step 1401 (FIG. 14A), the RFID apparatus 100 is placed into alignment calibration operation and the alignment calibration mode selected in step 1402, each in response directly to a manual operation (i.e. using keyboard 64 or display screen with touch sensor 54, etc.) or indirectly in response to programmed or remotely supplied (i.e. such as through the alignment fixture 1202 configured with at least one signal interface) commands to the RFID apparatus 100. Further, in step 1402, the selected alignment calibration mode is store, either locally or remotely, for subsequent use in the alignment calibration process.

In step 1403 (FIG. 14B), the alignment calibration process 1400 continues, with the motion sensing device and RFID reader device enabled in step 1404 for use during the alignment calibration process. In step 1405 the RFID apparatus 100 is positioned manually or automatically within a predetermined distance of an RFID tag. A mechanical mount such as alignment fixture 1202 may optionally be provided to keep the RFID apparatus 100 stationary at a determined position and with a determined orientation during the calibration process. Also in step 1405, the RFID apparatus is aligned so that at least one sensing axis of the motion sensing device frame of reference is centered on an appropriate visual cue (visible reference mark) on a planar array of RFID tags (RFID array). For instance, if the positioning device is a camera, a camera field of view may include a visible reference mark to which the RFID apparatus may be aligned. In this instance, an image of the RFID tag array can be acquired and stored, either locally or remotely. Alternatively, or additionally, if the positioning device is an IMU, the IMU may be aligned such that one IMU axis intersects a visible reference mark and a second IMU axis is either vertical or horizontal. Alternatively, or additionally, if the positioning device is a laser, the RFID apparatus may be aligned such that a laser scan line overlaps the horizontal portion of the visible reference mark. In step 1406, the motion sensing device may acquires data to determine the separation distance between the RFID apparatus and the RFID tag array and one or more alignment differences between at least one sensing axis of the motion sensing device and the visible reference mark on the RFID array. In step 1407, the determined alignment differences are stored, either locally or remotely, for use in subsequent processing. In step 1408, at least one RFID reader antenna is selected and the transmit power level is adjusted for each selected RFID antenna to provide a suitable signal for reading responsive RFID tags on the RFID tag array. In step 1409, the RFID reader device attempts to acquire data sets from each responsive RFID tag on the RFID tag array including a measurement of the signal strength from a responsive RFID tag and the position information stored in a responsive RFID tag. In step 1410, the number of acquired data sets, and all acquired data set information are stored, either locally or remotely, for subsequent processing in the alignment calibration process. In step 1411, and using the selected alignment calibration mode (i.e. inclusion or exclusion), a signal strength threshold is determined for use in the processing of RFID tag signal strength values and determination of heat map regions as previously described. In step 1412, the determined signal strength threshold values is sorted, either locally or remotely, for subsequent use in the alignment calibration process. In step 1413, the process continues at step 1414.

In step 1414, the stored number of acquired data sets from step 1410 is compared with a value of zero. If the number of acquired data sets is greater than zero, then the calibration alignment process continues at step 1416 If the number of acquired data sets is not greater than zero, then the alignment calibration process continues at step 1415.

In step 1415, if the stored alignment configuration mode value from step 1402 matches the value representing an exclusion alignment calibration process, then the process continues at step 1420. If the stored alignment calibration mode value does not match the value representing exclusion mode, then the process continues at step 1403 to attempt to acquire sufficient data sets to determine alignment calibration values for the RFID apparatus.

In step 1416, if the alignment calibration mode value stored in step 1402 matches the value representing an exclusion alignment calibration process, then the process continues at step 1440. If the stored alignment calibration mode value does not match the value representing an exclusion alignment calibration process, then the process continues at step 1530.

In step 1420, the alignment calibration values are set to predetermined default values due to zero data sets (i.e. no RFID tags were measured with a signal strength value above the stored signal strength threshold from step 1412), indicating the RFID boresight intersects the RFID tag array in an area of the RFID tag array without RFID tags as shown in FIGS. 10A and 10B.

In step 1430 (FIG. 14C), the inclusion calibration alignment mode processing continues at step 1431, determining the heat map regions in a manner previously described for FIGS. 7A and 7B. In step 1432, the one or more RFID tags included in the heat map region with the range of highest signal strength values are stored, for subsequent use in the alignment calibration process. In step 1433, the stored data sets for the RFID tags of the highest signal strength are processed to determine the RFID boresight. In step 1434, the determined RFID boresight values are stored for subsequent use in the alignment calibration process. In step 1434, the alignment calibration values are determined from the stored values for; alignment differences between motion sensing device frame of reference and visible reference mark on the RID tag array, RFID boresight, and distance between the RFID apparatus and the RID tag array. In step 1436, the process continues at step 1450.

In step 1440 (FIG. 14D), the process continues at step 1441, counting the number of RFID tag data sets containing a signal strength value above a threshold determined in step 1411. In step 1441, if the count is zero, then the process continues at step 1442. If the count is not equal to zero, then the process continues at step 1443. In step 1442, the alignment calibration values for the RFID apparatus are set to predetermined default values, due to zero RFID tags having a measured signal strength value above the stored signal strength threshold, indicating the RFID boresight intersects the RFID tag array in an area of the RFID tag array without RFID tags as shown in FIGS. 10A and 10B. The process then continues at step 1449. In step 1443, one or more RFID tags are found to have measured signal strength values above the determined threshold, indicating the RFID boresight intersects the RFID tag array in an area of the RFID tag array containing RFID tags as shown in FIGS. 10A and 10B. In step 1444, the data sets for the found RFID tags are store, for subsequent use in the alignment calibration process. In step 1445, a heat map region is determined using the one or more found RFID tag data sets having measured signal strength values exceeding the determined threshold, and the RFID boresight determined. In step 1446, the determined RFID boresight is store for subsequent use in the alignment calibration process. In step 1447, the alignment calibration values for the RID apparatus are determined from the one or more alignment differences between the motion sensor device frame of reference and the RFID boresight. In step 1448, the determined alignment calibration values are adjusted to cause the resulting RFID boresight to align with the centroid of the predicted RFID boresight as shown in FIGS. 10A and 10B. The process continues at step 1449.

In step 1450, the determined alignment calibration value for the RFID apparatus are stored, either locally or remotely, for subsequent use in adjusting scan path data from the motion sensing device to more accurately depict the path followed by the RFID boresight.

In step 1460, the RFID apparatus is placed in normal operational mode, including the capability to determine a scan path from periodically acquired motion data from the motion sensing device, and display the determined scan path to a user.

In step 1461, the acquired scan path data from the motion sensing device is adjusted using the stored alignment calibration values and the adjusted data is displayed to the user as the path followed by the RFID boresight.

In another embodiment, a computer readable medium can include instructions that, when executed by at least one processor, instruct a computer to perform the steps outlined in FIGS. 14A-14D.

It should be noted that physical structures such as retail display fixtures can be any type of fixture to support inventory. For example, the fixture can be at least one of shelving units, linear clothing racks, non-linear clothing racks, tables with one or more surfaces, or any combination thereof.

The previously described embodiments are merely examples. For example, a plurality of the RFID apparatus 100 may include wireless connections to form a wireless mesh network where the RFID apparatus 100 are connected to one another and to computers and/or DBs through a cloud-based mesh network (a mesh cloud). Any changes to the RFID apparatus 100 and associated hardware of the mesh network elicit automatic reconfiguration of the mesh network based on available hardware.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the disclosure. The embodiments were chosen and described in order to best explain the principles of embodiments of the invention and the practical application, and to enable others of ordinary skill in the art to understand embodiments of the invention for various embodiments with various modifications as are suited to the particular use contemplated.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain principles and practical applications of the invention, and to thereby enable others skilled in the art to best utilize the invention and various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims of the present invention. The following claims are in no way intended to limit the scope of embodiments of the invention to the specific embodiments described herein.

What is claimed is:

1. A method of calibrating an RFID apparatus, the method comprising:
    positioning the RFID apparatus in a calibration location within a predetermined distance of an RFID tag array, the RFID apparatus having at least one RFID reader device including at least one transmit power level control and at least one RFID antenna to detect RFID tags and at least one motion sensing device;

aligning the RFID apparatus with a visible reference mark on the RFID tag array using the motion sensing device by aligning the RFID apparatus such that one axis of the motion sensing device intersects an optical reference mark on the RFID tag array and a second axis of the motion sensing device is either vertical or horizontal, and setting the RFID apparatus transmit power level control to a value determined by the position of the RFID apparatus relative to the RFID tag array;

acquiring (i) RFID tag information including signal strength using the at least one RFID reader device to generate an RFID antenna radiation pattern that includes a heat map, the heat map including a region of at least one RFID tag exceeding a predetermined signal strength, and (ii) position information stored in the at least one RFID tag exceeding a predetermined signal strength; and determining calibration values of the RFID apparatus based on alignment differences between the acquired RFID tag position information and at least one sensing axis of the motion sensing device.

2. The method of claim 1, further comprising:
a visible reference mark; and
  at least one RFID tag responsive to the RFID reader device of the RFID apparatus.

3. The method of claim 1, further comprising:
RFID inlay responsive to RFID reading device including stored information having at least a unique identifier and the coordinates of the RFID inlay relative to the visible reference mark on the RFID tag array.

4. The method according to claim 1, wherein determining the calibration values of the RFID apparatus includes steps:
determining a number of signal strength values;
in response to determining that the number of signal strength values is non-zero, computing at least one offset of at least one sensing axis of the motion sensing device from the optical reference mark on the RFID tag array; and
computing an approximate center of the RFID antenna radiation pattern that represents an RFID boresight using the acquired RFID tag position information; and
computing one or more offsets of the RFID boresight from the visible reference mark on the RFID tag array; and
determining one or more alignment differences between the at least one sensing axis of the motion sensing device and the RFID boresight using the computed zero or more offsets; and
determining one or more calibration values of the RFID apparatus using the zero or more determined alignment differences and the distance between the RFID apparatus and the RFID tag array.

5. The method of claim 4, further comprising:
computing one or more difference angles between the optical reference mark and the approximate center of the RFID antenna radiation pattern using the determined one or more alignment differences and the distance between the RFID apparatus and the RFID tag array.

6. The method of claim 4, further comprising:
computing, using the determined one or more alignment differences, one or more difference angles between a sensing axis of the motion sensing device and the approximate center of the RFID antenna radiation pattern using the determined zero or more alignment differences and the distance between the RFID apparatus and the RFID tag array.

7. The method according to claim 1, wherein determining the calibration values of the RFID apparatus includes steps:
in response to determining that the number of signal strength values is zero, computing at least one offset of at least one sensing axis of the motion sensing device from the optical reference mark on the RFID tag array; and
computing an approximate region of the RFID antenna radiation pattern that represents an RFID boresight using the acquired RFID tag position information; and
computing zero or more offsets of the RFID boresight from the visible reference mark on the RFID tag array; and
determining one or more alignment differences between the at least one sensing axis of the motion sensing device and the RFID boresight using the computed zero or more offsets; and
determining one or more calibration values of the RFID apparatus using the zero or more determined alignment differences and the distance between the RFID apparatus and the RFID tag array.

8. The method of claim 1, further comprising:
adjusting the RFID apparatus scan path data acquired by the at least one motion sensing device based on the determined one or more calibration values and the distance between the RFID apparatus and RFID tags.

9. The method of claim 1, further comprising:
providing a fixture to hold the RFID apparatus for calibrating.

10. The method of claim 1, wherein the motion sensing device is a camera, the aligning including:
aligning a camera field of view with a visible reference mark on the RFID tag array that corresponds to known coordinates on the RFID tag array; and
acquiring an optical image of the RFID tag array including the visible reference mark using the camera; and
computing one or more offsets between the center of the camera image and the visible reference mark in the image.

11. The method of claim 10, wherein the one or more offsets are computed using the visible reference mark of the optical image, the method further comprising:
determining the vertical and horizontal pixel offsets between the center of the visible reference mark in the optical image and the center of the optical image;
scaling the computed vertical and horizontal pixel offsets to the RFID tag array using image pixel dimensions, distance between the RFID apparatus and the RFID tag array and scaling of pixels to RFID tag array dimensions.

12. The method of claim 11, further comprising:
computing one or more difference angles between the center of the camera field of view and the approximate center of the visible reference mark using the scaled vertical and horizontal pixel offsets and the distance between the RFID apparatus and the RFID tag array.

13. The method of claim 1, wherein:
the motion sensing device comprises an inertial measurement unit (IMU) and
the aligning includes aligning the RFID apparatus such that one IMU axis intersects the optical reference mark on the RFID tag array and a second IMU axis is either vertical or horizontal.

14. A non-transitory computer readable medium including at least one processor and a memory storing instructions that, when executed, cause a computer to execute steps comprising:

aligning the RFID apparatus when the RFID apparatus is within a predetermined distance of an RFID tag array, the RFID apparatus having at least one RFID reader device including at least one transmit power level control and at least one RFID antenna to detect RFID tags and at least one motion sensing device, using the at least one motion sensing device to align the RFID apparatus with a visible reference mark on the RFID tag array;

determining a number of signal strength values;

in response to determining that the number of signal strength values is non-zero, computing at least one offset of at least one sensing axis of the motion sensing device from the optical reference mark on the RFID tag array; and setting the RFID apparatus transmit power level control to a value determined by the position of the RFID apparatus relative to the RFID tag array; and acquiring (i) RFID tag information including signal strength using the at least one RFID reader device to generate an RFID antenna radiation pattern that includes a heat map, the heat map including a region of at least one RFID tag exceeding a predetermined signal strength, and (ii) position information stored in the at least one RFID tag exceeding a predetermined signal strength;

computing an approximate center of the RFID antenna radiation pattern that represents an RFID boresight;

computing one or more offsets of the RFID boresight from the visible reference mark on the RFID tag array to determine a difference between the visible reference mark on the RFID tag array and the approximate center of the RFID tag antenna pattern;

determining alignment differences between at least one sensing axis of the motion sensing device and the RFID boresight using the computed zero or more offsets;

adjusting the RFID apparatus scan path data acquired by the at least one motion sensing device based on the determined alignment differences and a distance between the RFID apparatus and a distance between the RFID apparatus and RFID tags.

15. The computer readable medium of claim 14, wherein the motion sensing device is a camera, the aligning including:

aligning a camera field of view with a visible reference mark that corresponds to known coordinates on the RFID tag array; and acquiring an optical image of the visible reference mark on the RFID tag array using the camera.

16. The computer readable medium of claim 15, wherein offsets are computed using the visible reference mark of the optical image, the computer readable medium further including instructions that, when executed, cause the computer to perform:

scaling the computed vertical and horizontal pixel offsets to the RFID tag array using image pixel dimensions, distance between the RFID apparatus and the RFID tag array and scaling of pixels to RFID tag array dimensions.

17. The computer readable medium of claim 15, further comprising:

computing one or more difference angles between the RFID boresight and either the at least one sensing axis or the optical axis of the camera.

18. The computer readable medium of claim 14, wherein:

the motion sensing device comprises an inertial measurement unit (IMU), and the aligning includes aligning the RFID apparatus such that one IMU axis intersects a visible reference mark on the RFID tag array and a second IMU axis is either vertical or horizontal.

19. The computer readable medium of claim 14, wherein:

the motion sensing device is an illumination device, and the aligning includes aligning the RFID apparatus such that light projected by the illumination device overlaps, and is parallel to, a portion of a visible reference mark on the RFID tag array.

20. A system for calibrating an RFID apparatus to more accurately depict a scan path, comprising:

an RFID apparatus that is configured to calibrate when within a predetermined distance of an RFID tag array;

at least one motion sensing device configured to align the RFID apparatus to a visible reference mark on an RFID tag array, the at least one motion sensing device configured to acquire position and orientation information of the RFID apparatus relative to the RFID tag array using the data of the motion sensing device;

at least one RFID reader device including at least one transmit power level control and at least one RFID antenna configured to acquire RFID tag information including signal strength and information stored in the RFID tag using the at least one RFID antenna to generate an RFID antenna radiation pattern that includes a heat map, the heat map including a region of at least one RFID tag exceeding a predetermined signal strength;

at least one processor; and a memory storing instructions that, when executed, cause the processor to perform steps:

computing one or more offsets between at least one axis of the motion sensing device and the visible reference mark on the RFID tag array, to determine alignment differences between the at least one axis of the motion sensing device and the visual reference mark on the RFID tag array; and computing an approximate center of the RFID antenna radiation pattern from the heat map data that represents an RFID boresight;

computing one or more offsets of the approximate center of the heat map from the visual reference mark on the RFID tag array to determine alignment differences between the visual reference mark on the RFID tag array and the approximate center of the RFID tag antenna pattern; and computing the one or more alignment calibration values between the at least one axis of the motion sensing device and the approximate center of the RFID antenna radiation pattern using the determined offsets; and adjusting the RFID scan path data obtained from the motion sensing device based on the determined alignment calibration values and the distance between the RFID apparatus and a physical structure on which RFID tags are placed.

* * * * *